US012583281B2

(12) United States Patent
Takaki et al.

(10) Patent No.: US 12,583,281 B2
(45) Date of Patent: Mar. 24, 2026

(54) WORKING MACHINE

(71) Applicant: KUBOTA CORPORATION, Osaka (JP)

(72) Inventors: Takahiro Takaki, Osaka (JP); Go Takaki, Osaka (JP); Kazuto Okazaki, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 394 days.

(21) Appl. No.: 18/203,282

(22) Filed: May 30, 2023

(65) Prior Publication Data

US 2023/0295896 A1 Sep. 21, 2023

Related U.S. Application Data

(63) Continuation of application No. PCT/JP2021/044990, filed on Dec. 7, 2021.

(30) Foreign Application Priority Data

Dec. 17, 2020 (JP) ................................. 2020-209241
Dec. 17, 2020 (JP) ................................. 2020-209242

(51) Int. Cl.
*B60H 1/00* (2006.01)
*E02F 9/08* (2006.01)
*E02F 9/16* (2006.01)

(52) U.S. Cl.
CPC ....... *B60H 1/00285* (2013.01); *E02F 9/0866* (2013.01); *E02F 9/163* (2013.01)

(58) Field of Classification Search
CPC ............ B60H 1/00007; B60H 1/00285; B60H 1/00378; B60H 1/00392; E02F 9/0866; E02F 9/163

(Continued)

(56) References Cited

U.S. PATENT DOCUMENTS 11,987,130 B2 * 5/2024 Clowes .................... B60H 1/22
2019/0039439 A1 * 2/2019 Aldridge ................. B60L 58/26

(Continued)

FOREIGN PATENT DOCUMENTS

JP H 11-140906 A 5/1999
JP 11-291750 A 10/1999

(Continued)

OTHER PUBLICATIONS

International Search Report issued Mar. 1, 2022 in international application No. PCT/JP2021/044990, and English language translation thereof.

(Continued)

*Primary Examiner* — Jason S Daniels
(74) *Attorney, Agent, or Firm* — Greenblum & Bernstein, P.L.C.

(57) ABSTRACT

A working machine includes a machine body, a protection mechanism to protect an operator's seat on the machine body, a heater to heat an inside of the protection mechanism, a radiator device to cool an object to be cooled, the radiator device including a heat exchanger to perform heat exchange between the object and ambient air, and a first flow passage to guide air heated by the heat exchanger to the heater and to guide the air further heated by the heater to the inside of the protection mechanism.

18 Claims, 9 Drawing Sheets

(58) Field of Classification Search
USPC .......................... 296/190.01, 190.03, 190.09
See application file for complete search history.

(56) References Cited

U.S. PATENT DOCUMENTS

| | | | |
|---|---|---|---|
| 2019/0068028 A1 | 2/2019 | Tominaga et al. | |
| 2021/0062471 A1* | 3/2021 | Kaneda ................. | E02F 9/2235 |

FOREIGN PATENT DOCUMENTS

| | | |
|---|---|---|
| JP | 2011-020640 A | 2/2011 |
| JP | 2011-089369 A | 5/2011 |
| JP | 2013-002160 A | 1/2013 |
| JP | 2013-035402 A | 2/2013 |
| JP | 2013-082260 A | 5/2013 |

OTHER PUBLICATIONS

Written Opinion issued Mar. 1, 2022 in international application No. PCT/JP2021/044990, and English language translation thereof.
Office Action issued in European Patent Office (EPO) Counterpart Patent Appl. No. 21906448.2, dated Jun. 25, 2025.

* cited by examiner

WORKING MACHINE

CROSS REFERENCE TO RELATED APPLICATIONS

This application is a continuation application of International Application No. PCT/JP2021/044990, filed on Dec. 7, 2021, which claims the benefit of priority to Japanese Patent Application No. 2020-209241, filed on Dec. 17, 2020, and to Japanese Patent Application No. 2020-209242, filed on Dec. 17, 2020. The entire contents of each of these applications are hereby incorporated herein by reference.

BACKGROUND OF THE INVENTION

1. Field of the Invention

The present invention relates to a working machine such as a backhoe, for example.

2. Description of the Related Art

Japanese Unexamined Patent Application Publication No. 2013-2160 discloses an electric construction machine that guides air heated inside a control panel for controlling an electric motor to the inside of a protection mechanism to perform a heating operation without including a separate heating device such as a heater.

Japanese Unexamined Patent Application Publication No. 2011-89369 discloses a technique for a working machine including a heater device for blowing hot air into a protection mechanism (cabin) that protects an operator's seat, and a hydraulic pump and an electric motor that are arranged in a substantially sealed space, in which the heater device is warmed up by outside air discharged from an exhaust hole in the substantially sealed space to improve heating efficiency of the heater device.

SUMMARY OF THE INVENTION

In the technique in Japanese Unexamined Patent Application Publication No. 2013-2160, however, only the air heated inside the control panel may be insufficient to heat the inside of the protection mechanism. The technique in Japanese Unexamined Patent Application Publication No. 2011-89369 requires constant driving of the heater device to heat the inside of the protection mechanism and has a problem of large power consumption of a battery for heating.

Preferred embodiments of the present invention make it possible to efficiently heat the inside of a protection mechanism of a working machine.

A working machine according to an aspect of the present invention includes: a machine body; a protection mechanism to protect an operator's seat on the machine body; a heater to heat an inside of the protection mechanism; a radiator device to cool an object to be cooled, the radiator device including a heat exchanger to perform heat exchange between the object and ambient air; and a first flow passage to guide air heated by the heat exchanger to the heater and to guide the air further heated by the heater to the inside of the protection mechanism.

The heater may be operable to be driven by electric power from a storage battery provided in or on the machine body to heat air flowing in the first flow passage.

The working machine may further include an air blower to blow the air heated by the heat exchanger to the inside of the protection mechanism through the first flow passage.

The air blower may include a multiple-purpose fan to blow cooling air to the radiator device and to blow the ambient air heated by the radiator device to the first flow passage.

The working machine may further include a second flow passage to guide air inside the protection mechanism to the radiator device.

The working machine may further include an inside/outside air switching mechanism. The inside/outside air switching mechanism may be switchable between an inside-air circulation state in which the air inside the protection mechanism is guided to the radiator device through the second flow passage and an outside-air introduction state in which a flow of the air from the second flow passage to the radiator device is blocked and outside air is guided to the radiator device.

The working machine may further include: a cooler to cool the inside of the protection mechanism; and a cooling/heating switching mechanism. The cooling/heating switching mechanism may be switchable between a heating state in which a flow of air from the cooler to the inside of the protection mechanism is blocked and air heated by the heater is guided to the inside of the protection mechanism and a cooling state in which a flow of air from the heater to the inside of the protection mechanism is blocked and cool air blown from the cooler is guided to the inside of the protection mechanism.

The working machine may further include: a third flow passage to release air from the radiator device or the first flow passage to outside of the working machine; and a releasing/non-releasing switching mechanism. The releasing/non-releasing switching mechanism may be switchable between a releasing state in which a flow of air from the radiator device to the first flow passage or from the first flow passage to the inside of the protection mechanism is blocked and air is guided from the radiator device or the first flow passage to the third flow passage and a non-releasing state in which a flow of air from the radiator device or the first flow passage to the third flow passage is blocked and air is guided from the radiator device to the first flow passage or from the first flow passage to the inside of the protection mechanism.

The working machine may include a hydraulic device to be driven by hydraulic fluid, and the radiator device may include an oil cooler to cool the hydraulic fluid, which is the object to be cooled.

The working machine may include an electric device, and the radiator device may include a cooling water passage to allow cooling water for cooling the electric device to flow, and a radiator to cool the cooling water, which is the object to be cooled.

The electric device to be cooled by the radiator device may include at least one of the following: a storage battery; an electric motor; a motor driver to drive the electric motor by electric power of the storage battery; and a voltage converter to convert a voltage of the storage battery into a different voltage.

A working machine according to another aspect of the present invention includes: a machine body; a protection mechanism to protect an operator's seat on the machine body; a storage battery provided in or on the machine body; an electric motor to be driven by electric power from the storage battery; a hydraulic pump to be driven by power from the electric motor; a working device to be driven by a hydraulic pressure of hydraulic fluid supplied from the hydraulic pump; a thermal fluid heater to heat an inside of the protection mechanism by heat from the hydraulic fluid;

and an electric heater to be driven by electric power from the storage battery to heat the inside of the protection mechanism.

The working machine may further include a controller to control operation of the thermal fluid heater and operation of the electric heater.

The working machine may further include a fluid temperature detector to detect a temperature of the hydraulic fluid. The controller may be configured or programmed to control the operation of the thermal fluid heater and the operation of the electric heater based on a result detected by the fluid temperature detector.

The controller may be configured or programmed to cause the electric heater to perform heating and cause the thermal fluid heater to not perform heating or perform heating when the temperature of the hydraulic fluid is lower than a first threshold, and cause the electric heater to not perform heating and cause the thermal fluid heater to perform heating when the temperature of the hydraulic fluid is higher than or equal to the first threshold.

The working machine may further include a power level detector to detect a remaining power level of the storage battery. The controller may be configured or programmed to control the operation of the electric heater based on a result detected by the power level detector.

The working machine may further include a power level detector to detect a remaining power level of the storage battery. The controller may be configured or programmed to cause the electric heater to perform heating and cause the thermal fluid heater to not perform heating or perform heating when the temperature of the hydraulic fluid is lower than a first threshold and the remaining power level of the storage battery is higher than or equal to a second threshold, cause the electric heater to not perform heating and cause the thermal fluid heater to not perform heating or perform heating when the temperature of the hydraulic fluid is lower than the first threshold and the remaining power level of the storage battery is lower than the second threshold, and cause the electric heater to not perform heating and cause the thermal fluid heater to perform heating when the temperature of the hydraulic fluid is higher than or equal to the first threshold.

The working machine may further include: a hydraulic fluid tank to store the hydraulic fluid; a control valve to control a flow rate of the hydraulic fluid from the hydraulic pump to a hydraulic actuator of the working device; a first fluid passage to allow the hydraulic fluid sucked from the hydraulic fluid tank and then delivered by the hydraulic pump to flow toward the control valve; a second fluid passage to allow the hydraulic fluid having passed through the control valve to flow toward the hydraulic fluid tank; and a third fluid passage branching from one of the first fluid passage and the second fluid passage, extending through the inside of the protection mechanism, and merging with the one of the first fluid passage and the second fluid passage. The thermal fluid heater may include a heat exchanger to perform heat exchange between the hydraulic fluid flowing in the third fluid passage and ambient air, and a first fan to blow air around the heat exchanger toward the inside of the protection mechanism.

The working machine may further include: a switching valve switchable between a first position in which the hydraulic fluid is allowed to flow to the third fluid passage and a second position in which the hydraulic fluid to the third fluid passage is blocked; and a controller to switch the switching valve to the first position or the second position to switch between causing the thermal fluid heater to perform heating and causing the thermal fluid heater to not perform heating.

The working machine may include a fluid cooler disposed in the second fluid passage to cool the hydraulic fluid flowing through the second fluid passage. The third fluid passage may be connected to the second fluid passage at a location closer to the control valve than the fluid cooler.

The electric heater may include a heating wire to generate heat by being supplied with electric power, and a second fan to blow air around the heating wire toward the inside of the protection mechanism.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
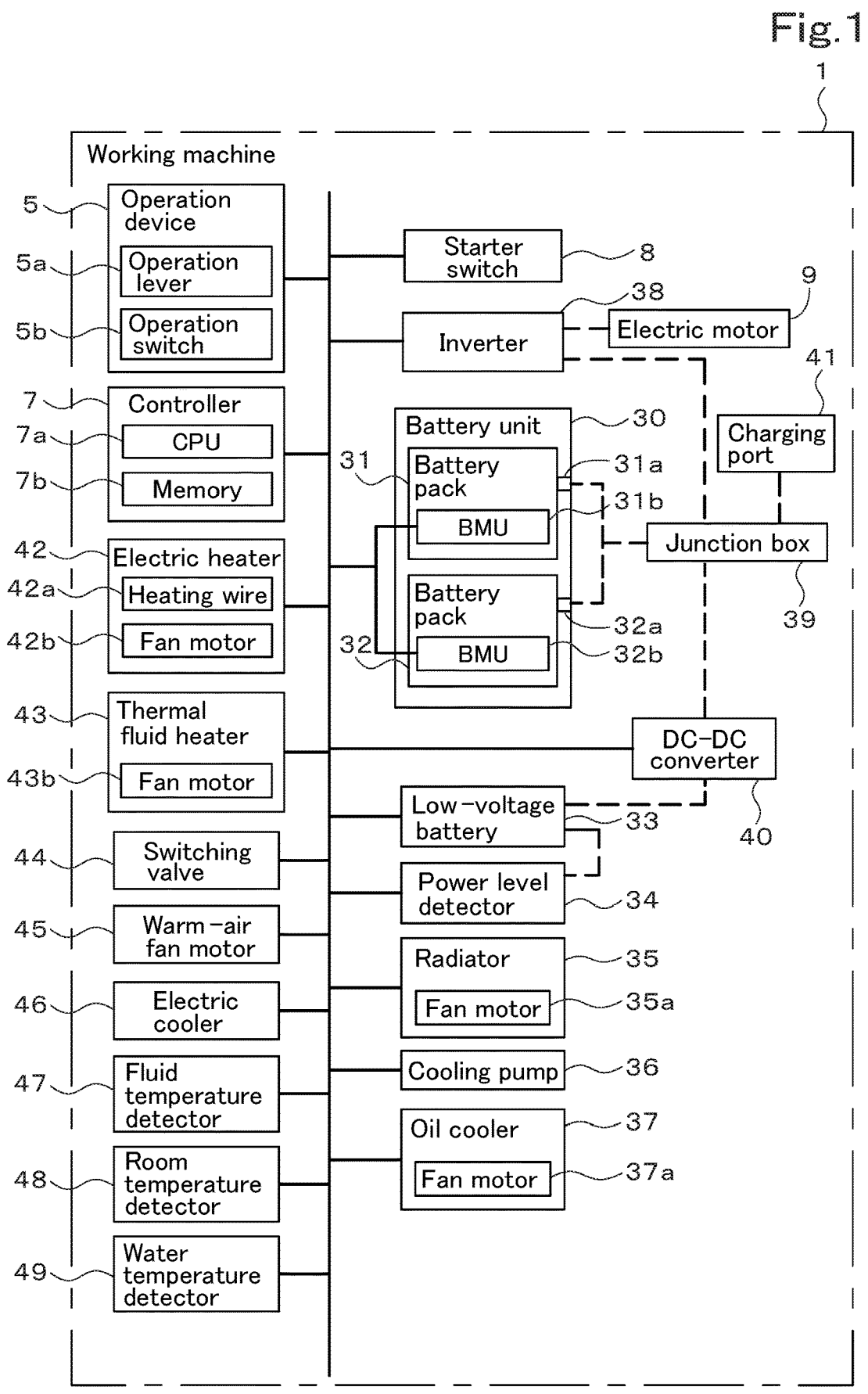
FIG. 1 is an electrical block diagram of a working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

An embodiment of the present invention will be described hereinafter with reference to the drawings.

First, an overall configuration of a working machine 1 will be described.

Figure 8:
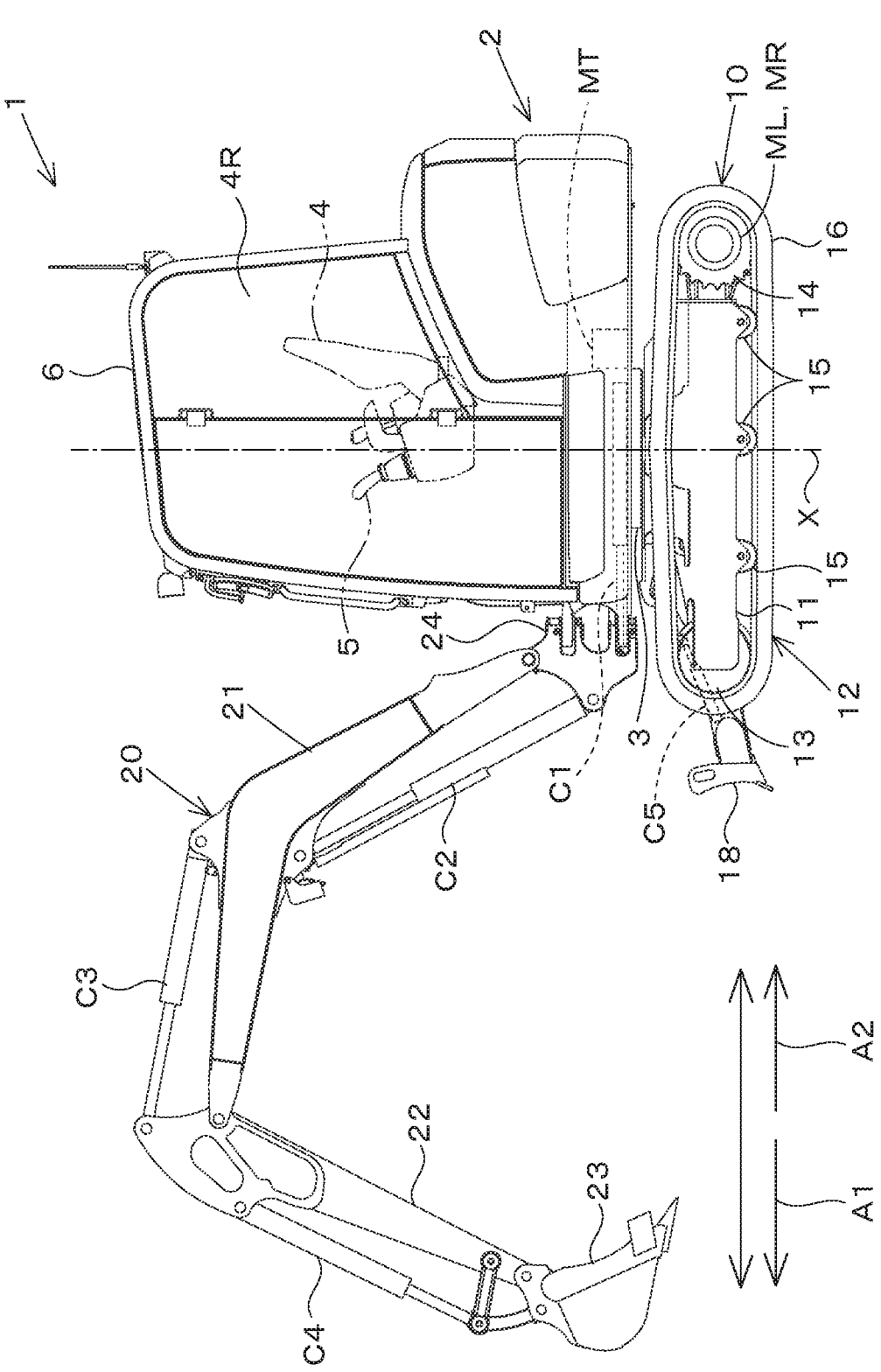
FIG. 8 is an overall side view of the working machine.

FIG. 8 is an overall side view of the working machine 1.

The working machine 1 is an electric backhoe. The working machine 1 includes a machine body (swivel base) 2, a traveling device 10, a working device 20, and so on.

The machine body 2 has mounted thereon an operator's seat 4 on which an operator sits and a protection mechanism 6 that protects the operator's seat 4 from front and rear, right and left, and above. The protection mechanism 6 includes frames (without reference numerals) forming a framework, and a wall body (without reference numerals) between the frames. The frames are fixed to the machine body 2. The wall body has a transparent portion (so-called window) through which the surroundings are viewable from the operator's seat 4. The protection mechanism 6 separates the space around the operator's seat 4 from the outside. That is, the protection mechanism 6 forms an operator's cab 4R having the operator's seat 4.

An operation device 5 is disposed around the operator's seat 4 inside the protection mechanism 6 (in the operator's cab 4R) to operate the working machine 1. The operator can operate the operation device 5 while seated on the operator's seat 4.

In the present embodiment, a description will be made defining a direction extending from the front of the operator seated on the operator's seat 4 (arrow A1 direction in FIG. 8) as the front direction and a direction extending from the rear of the operator (arrow A2 direction in FIG. 8) as the rear direction. The description will be made defining, further, a horizontal direction orthogonal to the front-rear direction as the width direction. The description will be made defining, further, a direction extending from the left of the operator facing the front A1 when the operator is sitting on the operator's seat 4 as the left direction and a direction extending from the right of the operator as the right direction.

The traveling device 10 is a device that causes the machine body 2 to travel, and includes a traveling frame 11 and at least one traveling mechanism 12. The traveling frame (track frame) 11 is a structure having the traveling mechanism 12 attached therearound and having an upper portion for supporting the machine body 2.

The traveling mechanism 12 is, for example, a crawler traveling mechanism. The traveling mechanism 12 is disposed on each of the left and right sides of the traveling frame 11. Each of the traveling mechanisms 12 includes an idler 13, a drive wheel 14, a plurality of track rollers 15, an endless crawler belt 16, and a corresponding one of traveling motors ML and MR.

The idler 13 is arranged in a front portion of the traveling frame 11. The drive wheel 14 is arranged in a rear portion of the traveling frame 11. The plurality of track rollers 15 are disposed between the idler 13 and the drive wheel 14. The crawler belt 16 is wound around the idler 13, the drive wheel 14, and the track rollers 15.

The left traveling motor ML is included in the traveling mechanism 12 on the left side of the traveling frame 11. The right traveling motor MR is included in the traveling mechanism 12 on the right side of the traveling frame 11. The traveling motors ML and MR include hydraulic motors. In each of the traveling mechanisms 12, the drive wheel 14 is rotatably driven by the power of the corresponding one of the traveling motors ML and MR to circularly move the crawler belt 16 in the circumferential direction.

A dozer 18 is mounted on the front portion of the traveling device 10. The dozer 18 swings up and down in response to expansion and contraction of a dozer cylinder C5. The dozer cylinder C5 is attached to the traveling frame 11. The dozer cylinder C5 includes a hydraulic cylinder.

The machine body 2 is supported on the traveling frame 11 via a swivel bearing 3 so as to be rotatable about a swivel axis X. A swivel motor MT is disposed inside the machine body 2. The swivel motor MT includes a hydraulic motor (hydraulic actuator included in a hydraulic device M). The machine body 2 swivels about the swivel axis X by the power of the swivel motor MT.

The working device 20 is supported at the front portion of the machine body 2. The working device 20 includes a boom 21, an arm 22, a bucket (working tool) 23, and hydraulic cylinders C1 to C5. The boom 21 has a proximal end pivotally attached to a swing bracket 24 so as to be rotatable around a horizontal axis (axis extending in the width direction of the machine body 2). Accordingly, the boom 21 is swingable in the up-down direction (vertical direction). The arm 22 is pivotally attached to a distal end of the boom 21 so as to be rotatable around the horizontal axis. Accordingly, the arm 22 is swingable in the front-rear direction or the up-down direction. The bucket 23 is disposed at the distal end of the arm 22 so as to be capable of shoveling and dumping.

Instead of or in addition to the bucket 23, another working tool (hydraulic attachment) that can be driven by the hydraulic actuator is mountable on the working machine 1. Examples of the other working tool include a hydraulic breaker, a hydraulic crusher, an angle broom, an earth auger, a pallet fork, a sweeper, a mower, and a snow blower.

The swing bracket 24 swings right and left in response to expansion and contraction of the swing cylinder C1 included in the machine body 2. The boom 21 swings up and down (back and forth) in response to expansion and contraction of the boom cylinder C2. The arm 22 swings up and down (back and forth) in response to expansion and contraction of the arm cylinder C3. The bucket 23 performs shoveling and dumping in response to expansion and contraction of the bucket cylinder (working tool cylinder) C4. The swing cylinder C1, the boom cylinder C2, the arm cylinder C3, and the bucket cylinder C4 each include a hydraulic cylinder.

The working machine 1 performs work using the traveling device 10 including the traveling motors ML and MR and the hydraulic cylinders C1 to C5 described above, the working device 20, and the swivel motor MT. The hydraulic actuators, such as the traveling motors ML and MR, the swivel motor MT, and the hydraulic cylinders C1 to C5, are included in hydraulic devices. The traveling device 10 is also a working device included in the working machine 1.

Next, an electrical configuration of the working machine 1 will be described.

FIG. 1 is an electrical block diagram of the working machine 1.

The operation device 5 of the working machine 1 has at least one operation lever 5a and an operation switch 5b. The operation lever 5a and the operation switch 5b can be operated by an operator seated on the operator's seat 4. In FIG. 1, the operation lever 5a and the operation switch 5b are each illustrated as a single block for simplicity. In actuality, however, a plurality of operation levers 5a and a plurality of operation switches 5b are disposed.

A controller 7 is disposed in the machine body 2, and includes a CPU 7a and a memory 7b. The CPU 7a controls the operation of the components included in the working machine 1, as illustrated in FIG. 1. The memory 7b includes a memory and the like. The memory 7b stores information, data, programs, and so on for the CPU 7a to control the operation of the components. The memory 7b further stores data for the CPU 7a to control the operation of the components in a readable and writable manner.

A starter switch 8 is disposed inside the protection mechanism 6 and can be operated by the operator seated on the operator's seat 4. The starter switch 8 is turned on, thereby allowing the controller 7 to start the components included in the working machine 1. The starter switch 8 is turned off, thereby allowing the controller 7 to stop the components included in the working machine 1.

An electric motor 9 is a drive source of the working machine 1 and includes a permanent-magnet-embedded three-phase AC synchronous motor, for example. An inverter 38 is a motor driver that drives the electric motor 9. The inverter 38 is connected to the electric motor 9 and a junction box 39. The junction box 39 is connected to, in addition to the inverter 38, a battery unit 30, a DC-DC converter 40, and a charging port 41. The junction box 39 outputs electric power input from the battery unit to the inverter 38 and the DC-DC converter 40.

The inverter 38 converts DC power input from the battery unit 30 through the junction box 39 into three-phase AC power and supplies the three-phase AC power to the electric motor 9. Accordingly, the electric motor 9 is driven. Further, the inverter 38 can change the current and voltage of the electric power to be supplied to the electric motor 9, as appropriate. The controller 7 controls the operation of the inverter 38 to drive or stop the electric motor 9.

The DC-DC converter 40 is a voltage converter that converts a DC voltage input from the battery unit 30 through the junction box 39 into a different voltage. In the present embodiment, the DC-DC converter 40 is a step-down converter that converts a high voltage of the battery unit 30 into a predetermined low voltage. The DC-DC converter 40 supplies electric power to a low-voltage battery 33 after voltage conversion.

The charging port 41 includes a connector or the like into which a charging cable (not illustrated) connected to an external power supply is fitted. The junction box 39 outputs, to the battery unit 30, electric power input from the external power supply via the charging cable through the charging port 41. The battery unit 30 is charged with the electric power input through the charging port 41.

The battery unit 30 is a storage battery and includes a plurality of battery packs 31 and 32. The plurality of battery packs 31 and 32 are connected to each other in parallel. The battery packs 31 and 32 are each a secondary battery such as a lithium ion battery or a lead storage battery, for example. Each of the battery packs 31 and 32 has a plurality of cells therein, and the plurality of cells are electrically connected in series and/or in parallel. In FIG. 1, the battery unit 30 includes two battery packs 31 and 32. However, the number of battery packs included in the battery unit 30 is not limited to two, and may be one or three or more.

The battery packs 31 and 32 are provided with connection switches 31a and 32a, respectively. Each of the connection switches 31a and 32a includes a relay, a switch, or the like, for example, and is switched between a connected state and a disconnected state. The controller 7 switches one of the connection switches 31a and 32a to the connected state and switches the other connection changeover unit to the disconnected state, thereby supplying electric power from one of the battery packs 31 and 32 to the electric motor 9 through the junction box 39 and the inverter 38 and stopping the supply of electric power from the other battery pack. That is, the controller 7 controls output and stop of output of electric power from the battery packs 31 and 32.

The battery packs 31 and 32 are also provided with BMUs (battery management units) 31b and 32b, respectively. In FIG. 1, the BMUs 31b and 32b are disposed in the battery packs 31 and 32. However, the BMUs 31b and 32b may be incorporated in the battery packs 31 and 32, respectively, or may be disposed outside the battery packs 31 and 32.

Each of the BMUs 31b and 32b monitors and controls a corresponding one of the battery packs 31 and 32. Specifically, the BMUs 31b and 32b control the opening and closing of relays included inside the battery packs 31 and 32 to control the start and stop of the supply of electric power from the battery packs 31 and 32. Further, the BMUs 31b and 32b detect the temperatures, voltages, currents, the terminal voltages of the internal cells, or the like of the battery packs 31 and 32.

Further, the BMUs 31b and 32b detect the remaining capacities of the battery packs 31 and 32 by a voltage measurement method based on, for example, the terminal voltages of the internal cells of the battery packs 31 and 32. The method for detecting the remaining capacities of the battery packs 31 and 32 is not limited to the voltage measurement method. Any other method such as a coulomb counter method, a cell modeling method, or an impedance track method may be used. Alternatively, power level detector(s) that detect the remaining capacities of the battery packs 31 and 32 may be disposed separately from the BMUs 31b and 32b.

The low-voltage battery 33 is a storage battery having a voltage lower than that of the battery unit 30. The low-voltage battery 33 is charged with electric power supplied from the DC-DC converter 40. The low-voltage battery 33 supplies electric power to electric devices included in the working machine 1. A power level detector 34 is an electric circuit that detects the remaining power level of the low-voltage battery 33.

A radiator 35 cools high-heat-generating electric devices, such as the electric motor 9, the inverter 38, the DC-DC converter 40, and the battery unit 30, using cooling water (refrigerant). More specifically, the cooling water is cooled by the radiator 35. The high-heat-generating electric devices are electric devices that are driven to generate an amount of heat larger than other devices included in the working machine 1 among electric devices that use electricity. The cooling water is not simply water, and includes a liquid that does not freeze even in a cold environment, for example. The radiator 35 includes a fan motor 35a. The radiator 35 further includes a radiator fan 35f that is rotatably driven by the power of the fan motor 35a, and a heat exchanger 35b (second heat exchanger, illustrated in FIG. 3 described below). The fan motor 35a is driven by the electric power of the low-voltage battery 33.

A cooling pump 36 is disposed in a cooling water passage 60 (illustrated in FIG. 3) provided in the machine body 2, together with the radiator 35 and the high-heat-generating electric devices 9, 38, 40, and 30. The cooling pump 36 delivers and circulates cooling water through the cooling water passage 60. The cooling water delivered from the cooling pump 36 and flowing through the cooling water passage 60 is subjected to heat exchange in the high-heat-generating electric devices 9, 38, 40, and 30 described above, and flows to the radiator 35. In the radiator 35, the radiator fan 35f is rotatably driven by the power of the fan motor 35a to generate cooling air, and the cooling air cools (removes heat from) the cooling water flowing through the cooling water passage 60.

An oil cooler 37 cools hydraulic fluid that has passed through hydraulic devices, such as the hydraulic actuators ML, MR, MT, and C1 to C5 described above, and hydraulic pumps P1 and P2 and a control valve unit V (illustrated in FIG. 2 and so on) described below. The oil cooler 37 includes a fan motor 37a. The oil cooler 37 further includes an oil cooler fan 37f that is rotatably driven by the power of the fan motor 37a, and a heat exchanger 37b (first heat exchanger, illustrated in FIG. 3 described below). The fan motor 37a is driven by the electric power of the low-voltage battery 33.

The oil cooler 37, the hydraulic devices ML, MR, MT, C1 to C5, P1, P2, and V described above, and the like are disposed in a fluid passage 50 (illustrated in FIG. 2 and so on) described below. The hydraulic fluid delivered from the hydraulic pumps P1 and P2 and flowing through the fluid passage 50 is heated by the hydraulic devices ML, MR, MT, C1 to C5, P1, P2, and V described above and the like and flows to the oil cooler 37. In the oil cooler 37, the oil cooler fan 37f is rotatably driven by the power of the fan motor 37a to generate cooling air, and the cooling air cools (removes heat from) the hydraulic fluid flowing through the fluid passage 50.

An electric heater 42 is driven by the electric power of the low-voltage battery 33 to heat the inside of the protection mechanism 6. The electric heater 42 is an electrical heater and includes a heating wire 42a and a fan motor 42b. The heating wire 42a generates high heat by being supplied with electric power. The fan motor 42b rotatably drives a fan 42f (illustrated in FIG. 3) described below. The fan motor 42b is driven by the electric power of the low-voltage battery 33.

A thermal fluid heater 43 heats the inside of the protection mechanism 6 by using heat of the hydraulic fluid for activating the hydraulic actuators ML, MR, MT, and C1 to C5. The thermal fluid heater 43 includes a fan motor 43b. The fan motor 43b rotatably drives a fan 43f (illustrated in FIG. 5 and so on) described below. A switching valve 44 includes, for example, a two-position switching valve with a solenoid valve. The switching valve 44 is disposed in the fluid passage 50 (illustrated in FIG. 5 and so on).

A warm-air fan motor 45 is a power source of a warm-air fan (such as a fan 75a, 75b, or 75c in FIG. 3, for example) for sending warm air into the protection mechanism 6. In FIG. 1, the warm-air fan motor 45 is illustrated as one block for simplicity. However, the warm-air fan motor 45 is provided for each warm-air fan. Further, a motor drive circuit (not illustrated) for driving the warm-air fan motor 45 is also provided for each warm-air fan.

An electric cooler 46 includes, for example, an air conditioner. The electric cooler 46 is driven by the electric power of the low-voltage battery 33 to cool the inside of the protection mechanism 6. A fluid temperature detector 47 is a sensor that detects the temperature of the hydraulic fluid (fluid temperature). A room temperature detector 48 is a sensor that detects the temperature (room temperature) of the inside of the protection mechanism 6. A water temperature detector 49 is a sensor that detects the temperature of the cooling water (water temperature).

Next, a hydraulic circuit included in the working machine 1 will be described.

Figure 2:
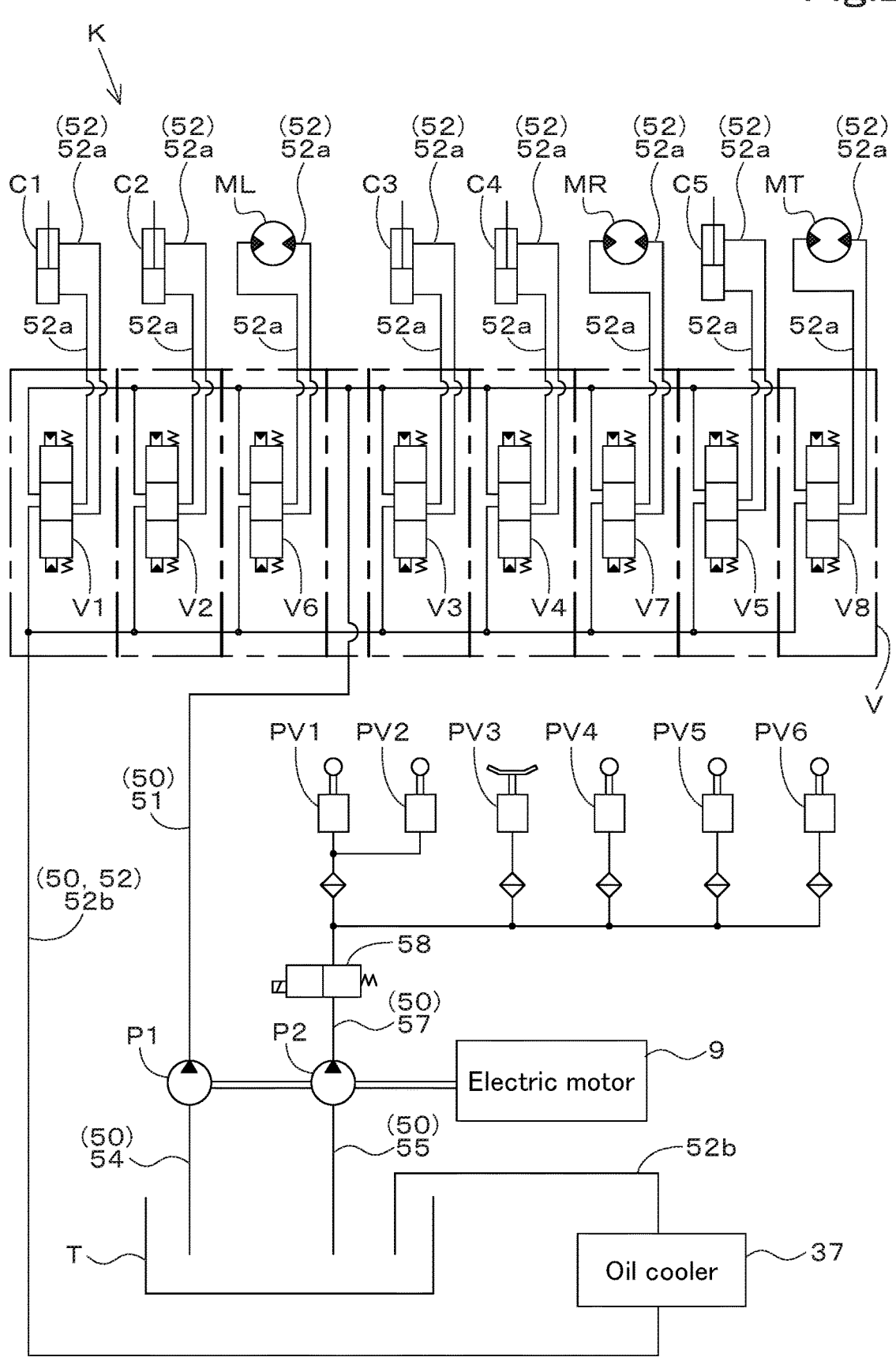
FIG. 2 is a diagram illustrating a hydraulic circuit of the working machine.

FIG. 2 is a diagram illustrating a hydraulic circuit K included in the working machine 1.

The hydraulic circuit K includes hydraulic devices such as the hydraulic actuators C1 to C5, ML, MR, and MT, the control valve unit V, the hydraulic pumps P1 and P2, a hydraulic fluid tank T, the oil cooler 37, operation valves PV1 to PV6, an unloading valve 58, and the fluid passage 50.

One of the plurality of hydraulic pumps P1 and P2 is an operating hydraulic pump P1, and the other is a control hydraulic pump P2. The hydraulic pumps P1 and P2 are driven by the power of the electric motor 9.

The operating hydraulic pump P1 sucks in the hydraulic fluid stored in the hydraulic fluid tank T and then delivers the hydraulic fluid toward the control valve unit V. In FIG. 2, one operating hydraulic pump P1 is illustrated for simplicity.

However, this does not imply any limitation, and it is desirable that an appropriate number of operating hydraulic pumps be disposed.

The control hydraulic pump P2 sucks in and then delivers the hydraulic fluid stored in the hydraulic fluid tank T to output a hydraulic pressure for signal or control. That is, the control hydraulic pump P2 supplies (delivers) pilot fluid. It is desirable that an appropriate number of control hydraulic pumps P2 be disposed.

The control valve unit V includes a plurality of control valves V1 to V8. The control valves V1 to V8 control (adjust) the flow rates of the hydraulic fluid to be output from the hydraulic pumps P1 and P2 to the hydraulic actuators C1 to C5, ML, MR, and MT.

Specifically, the swing control valve V1 controls the flow rate of the hydraulic fluid to be supplied to the swing cylinder C1. The boom control valve V2 controls the flow rate of the hydraulic fluid to be supplied to the boom cylinder C2. The arm control valve V3 controls the flow rate of the hydraulic fluid to be supplied to the arm cylinder C3. The bucket control valve V4 controls the flow rate of the hydraulic fluid to be supplied to the bucket cylinder C4. The dozer control valve V5 controls the flow rate of the hydraulic fluid to be supplied to the dozer cylinder C5. The left travel control valve V6 controls the flow rate of the hydraulic fluid to be supplied to the left traveling motor ML. The right travel control valve V7 controls the flow rate of the hydraulic fluid to be supplied to the right traveling motor MR. The swing control valve V8 controls the flow rate of the hydraulic fluid to be supplied to the swivel motor MT.

The operation valves PV1 to PV6 are activated in accordance with operations of the various operation levers 5a (FIG. 1) included in the operation device 5. The pilot fluid acts on the control valves PV1 to PV6 in proportion to the amounts of activation (amounts of operation) of the operation valves V1 to V8, thereby moving spools of the control valves V1 to V8. The hydraulic fluid in amounts proportional to the amounts of movement of the spools of the control valves V1 to V8 is supplied to the hydraulic actuators C1 to C5, ML, MR, and MT to be controlled. Further, the hydraulic actuators C1 to C5, ML, MR, and MT are driven in accordance with the amounts of hydraulic fluid supplied from the control valves V1 to V8.

In other words, the operation levers 5a are operated, thereby adjusting the hydraulic pressures of the hydraulic fluid (pilot fluid) acting on the control valves V1 to V8 and controlling the control valves V1 to V8. The amounts of the hydraulic fluid to be supplied from the control valves V1 to V8 to the hydraulic actuators C1 to C5, ML, MR, and MT are adjusted to control the driving and stopping of the hydraulic actuators C1 to C5, ML, MR, and MT.

The fluid passage 50 includes, for example, a hose or a pipe formed of a material such as metal. The fluid passage 50 is a flow passage that connects the components of the hydraulic circuit K and allows hydraulic fluid or pilot fluid to flow to the components. The fluid passage 50 includes a first fluid passage 51, a second fluid passage 52, a first suction fluid passage 54, a second suction fluid passage 55, and a limiting fluid passage 57.

The first suction fluid passage 54 is a flow passage through which the hydraulic fluid sucked in from the hydraulic fluid tank T by the operating hydraulic pump P1 flows. The second suction fluid passage 55 is a flow passage through which the hydraulic fluid sucked in from the hydraulic fluid tank T by the control hydraulic pump P2 flows.

The first fluid passage 51 is a flow passage through which the hydraulic fluid delivered from the operating hydraulic pump P1 flows toward the control valves V1 to V8 of the control valve unit V. The first fluid passage 51 branches into a plurality of passages in the control valve unit V, and the passages are connected to the respective control valves V1 to V8.

The second fluid passage 52 is a flow passage through which the hydraulic fluid having passed through the control valves V1 to V8 flows toward the hydraulic fluid tank T. The hydraulic fluid tank T stores hydraulic fluid. The second fluid passage 52 includes reciprocating fluid passages 52a and a discharge fluid passage 52b.

A plurality of reciprocating fluid passages 52a are disposed such that pairs of two reciprocating fluid passages 52a connect the control valves V1 to V8 to the hydraulic actuators C1 to C5, ML, MR, and MT to be controlled, respectively. The reciprocating fluid passage 52a are flow passages through which the hydraulic fluid is supplied from the control valves V1 to V8 connected thereto to the hydraulic actuators C1 to C5, ML, MR, and MT or through which the hydraulic fluid is returned from the hydraulic actuators C1 to C5, ML, MR, and MT to the control valves V1 to V8. One end of the discharge fluid passage 52b branches into a plurality of passages, and the passages are connected to the respective control valves V1 to V8. The other end of the discharge fluid passage 52b is connected to the hydraulic fluid tank T.

A portion of the hydraulic fluid flowing to one of the control valves V1 to V8 through the first fluid passage 51 passes through the one of the control valves V1 to V8, and is supplied to a corresponding one of the hydraulic actuators C1 to C5, ML, MR, and MT to be controlled passes through one of the paired reciprocating fluid passages 52a. The hydraulic fluid discharged from the corresponding one of the hydraulic actuators C1 to C5, ML, MR, and MT returns to the connected one of the control valves V1 to V8 through the other reciprocating fluid passage 52a, and flows to the discharge fluid passage 52b through the one of the control valves V1 to V8.

The remaining portion of the hydraulic fluid flowing to the one of the control valves V1 to V8 through the first fluid passage 51 passes through the one of the control valves V1 to V8 and flows to the discharge fluid passage 52b without being supplied to the corresponding one of the hydraulic actuators C1 to C5, ML, MR, and MT. The oil cooler 37 is disposed in the discharge fluid passage 52b. The oil cooler 37 cools the hydraulic fluid flowing thereto from one of the control valves V1 to V8 through the discharge fluid passage 52b.

The hydraulic fluid cooled by the oil cooler 37 returns to the hydraulic fluid tank T through the discharge fluid passage 52b. As described above, the fluid passages 54, 51, and 52 are provided so as to circulate the hydraulic fluid to the hydraulic fluid tank T, the hydraulic pump P1, and the control valves V1 to V8 of the control valve unit V (a portion of the hydraulic fluid is also circulated through the hydraulic actuators C1 to C5, ML, MR, and MT).

The limiting fluid passage 57 is a flow passage through which the hydraulic fluid delivered from the control hydraulic pump P2 flows to the operation valves PV1 to PV6. One end of the limiting fluid passage 57 is connected to the control hydraulic pump P2, and the other end thereof branches into a plurality of passages such that the passages are connected to ports on the primary side (primary ports) of the operation valves PV1 to PV6.

The unloading valve 58 is disposed in the limiting fluid passage 57. The unloading valve 58 blocks the supply of the hydraulic fluid from the operating hydraulic pump P1 to the hydraulic actuators C1 to C5, ML, MR, and MT to prohibit or limit the driving of the hydraulic actuators C1 to C5, ML, MR, and MT, that is, the driving of the working device 20.

Specifically, the unloading valve 58 is switched between a supply position and a blocking position in response to operation of an unload lever (not illustrated). The unloading valve 58 is switched to the supply position, thereby supplying, to the operation valves PV1 to PV6, the hydraulic fluid delivered from the control hydraulic pump P2 to the limiting fluid passage 57. As a result, the operation of the control valves V1 to V8 is enabled. Accordingly, the operation of the hydraulic actuators C1 to C5, ML, MR, and MT and the working device 20 is also enabled. The hydraulic fluid discharged from the operation valves PV1 to PV6 returns to the hydraulic fluid tank T through another discharge fluid passage (not illustrated).

By contrast, the unloading valve 58 is switched to the blocking position, thereby discharging, to the hydraulic fluid tank T, the hydraulic fluid delivered from the control hydraulic pump P2 to the limiting fluid passage 57 and preventing the supply (stopping the supply) of the hydraulic fluid to the operation valves PV1 to PV6. As a result, the operation of the control valves V1 to V8 is prohibited or restricted. Accordingly, the operation of the hydraulic actuators C1 to C5, ML, MR, and MT and the working device 20 is also prohibited or restricted.

Next, a cooling path and a heating path of the working machine 1 according to a first embodiment will be described.

Figure 3:
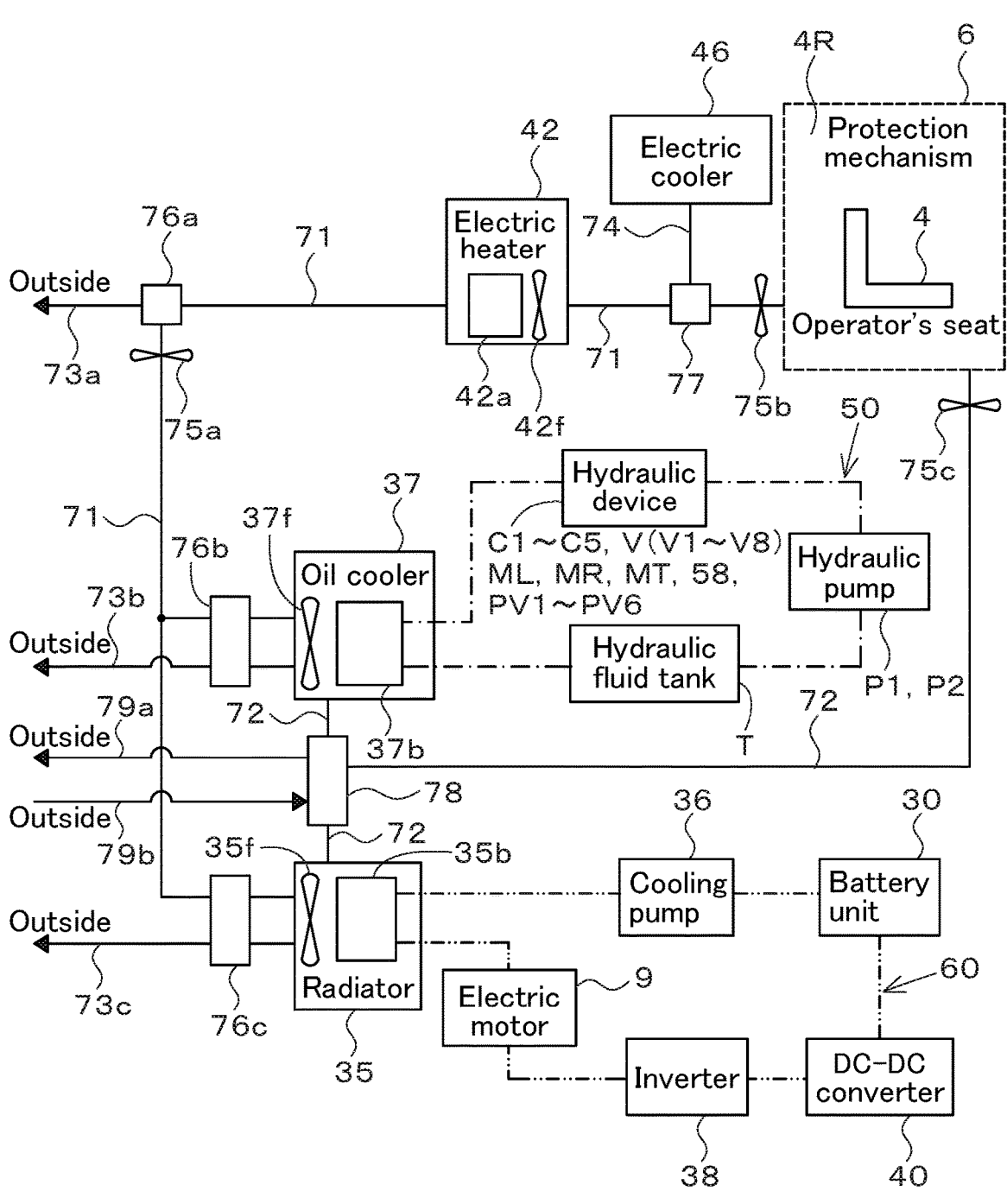
FIG. 3 is a schematic diagram illustrating a cooling path and a heating path of a working machine according to a first embodiment.

FIG. 3 is a schematic diagram illustrating the cooling path and the heating path of the working machine 1 according to the first embodiment.

The working machine 1 includes a cooling path for hydraulic fluid and a cooling path for cooling water. The cooling path for the hydraulic fluid includes the fluid passage 50 described above (indicated by a dash-dot line in FIG. 3). The fluid passage 50 is provided with the hydraulic fluid tank T, the hydraulic pumps P1 and P2, the hydraulic devices V, C1 to C5, ML, MR, MT, 58, and PV1 to PV6, and the oil cooler 37.

The hydraulic fluid stored in the hydraulic fluid tank T is sucked in by the hydraulic pumps P1 and P2 and then delivered, and flows to the control valves V1 to V8 of the control valve unit V included in the hydraulic devices, the hydraulic actuators C1 to C5, ML, MR, and MT, or the unloading valve 58 or the operation valves PV1 to PV6 through the fluid passage 50. Specifically, the hydraulic fluid delivered from the operating hydraulic pump P1 flows to at least one of the control valves V1 to V8 of the control valve unit V. The hydraulic fluid delivered from the control hydraulic pump P2 flows to at least the unloading valve 58.

The hydraulic pumps P1 and P2, the control valves V1 to V8, the hydraulic actuators C1 to C5, ML, MR, and MT, the unloading valve 58, and the operation valves PV1 to PV6 generate heat when driven. Accordingly, when the hydraulic fluid flowing through the fluid passage 50 passes through the hydraulic pumps P1 and P2, the control valves V1 to V8, the hydraulic actuators C1 to C5, ML, MR, and MT, the unloading valve 58, or the operation valves PV1 to PV6, the hydraulic fluid absorbs heat from these hydraulic devices and is heated by the heat (heat exchange).

The hydraulic fluid that has passed through the hydraulic devices V (V1 to V8), C1 to C5, ML, MR, MT, 58, and PV1 to PV6 flows to the oil cooler 37 through the fluid passage 50. In the oil cooler 37, the hydraulic fluid flowing thereto through the fluid passage 50 is cooled by the heat exchanger 37*b* and the oil cooler fan 37*f*.

Specifically, the heat exchanger 37*b* is formed of a material such as a metal having high thermal conductivity, for example. The heat exchanger 37*b* includes a tube through which the hydraulic fluid flows and a plurality of fins disposed around the tube (not illustrated in detail). The hydraulic fluid flows from one end to the other end of the tube of the heat exchanger 37*b*, whereby heat exchange is performed between the hydraulic fluid and the air around the tube and the fins. As a result, the hydraulic fluid flowing to the heat exchanger 37*b* through the fluid passage 50 is cooled (heat is removed), and the air around the heat exchanger 37*b* is heated.

Further, the oil cooler fan 37*f* is rotatably driven by the power of the fan motor 37*a* to suck in the ambient air and blow cooling air to the heat exchanger 37*b*. As a result, the heat exchanger 37*b* is cooled, and the performance of cooling the hydraulic fluid by the heat exchanger 37*b* is enhanced. The oil cooler 37 is a radiator device that cools the hydraulic fluid. The hydraulic fluid is an object to be cooled by the oil cooler 37. The hydraulic devices V (V1 to V8), C1 to C5, ML, MR, MT, 58, and PV1 to PV6 are cooled by the hydraulic fluid cooled by the oil cooler 37. That is, the hydraulic devices V (V1 to V8), C1 to C5, ML, MR, MT, 58, and PV1 to PV6 are also objects to be cooled by the oil cooler 37.

The cooling path for the cooling water includes the cooling water passage 60 described above (indicated by a dash-dot-dot line in FIG. 3). The cooling water passage 60 is provided with the electric motor 9, the inverter 38, the DC-DC converter 40, the battery unit 30, the cooling pump 36, and the radiator 35. The cooling water passage 60 includes a metal pipe. The cooling water passage 60 is provided to be in contact with or in close proximity to the electric motor 9, the inverter 38, the DC-DC converter 40, and the battery unit 30.

The cooling water delivered from the cooling pump 36 passes through the cooling water passage 60 and flows to the battery unit 30, the DC-DC converter 40, the inverter 38, and the electric motor 9. The order of arrangement of the cooling pump 36, the battery unit 30, the DC-DC converter 40, the inverter 38, and the electric motor 9 in the cooling water passage 60 is not limited to the order of arrangement illustrated in FIG. 3, and may be any other order of arrangement.

An electric device (such as the junction box 39) other than those described above may be disposed in the cooling water passage 60. Instead of the cooling water passage 60, a cooling water passage that branches midway may be used. Alternatively, a cooling water passage may be disposed such that at least some of the electrical components such as the battery unit 30, the DC-DC converter 40, the inverter 38, and the electric motor 9 are cooled by cooling water, and the cooling water may be cooled by the radiator 35 disposed in the cooling water passage.

The battery unit 30, the DC-DC converter 40, the inverter 38, and the electric motor 9 are driven to generate heat. Accordingly, when the cooling water flowing through the cooling water passage 60 passes through the battery unit 30, the DC-DC converter 40, the inverter 38, and the electric motor 9, the cooling water absorbs heat from these electric devices 30, 40, 38, and 9 and is heated by the heat (heat exchange). The cooling water passage 60 cools the electric devices 30, 40, 38, and 9 by means of cooling water.

The cooling water that has passed through the electric motor 9 flows to the radiator 35 through the cooling water passage 60. In the radiator 35, the cooling water flowing thereto through the cooling water passage 60 is cooled by the heat exchanger 35*b* and the radiator fan 35*f*.

Specifically, the heat exchanger 35*b* is formed of a material such as a metal having high thermal conductivity, for example. The heat exchanger 35*b* includes a tube through which the hydraulic fluid flows and a plurality of fins disposed around the tube (not illustrated in detail). The hydraulic fluid flows from one end to the other end of the tube of the heat exchanger 35*b*, whereby heat exchange is performed between the hydraulic fluid and the air around the tube and the fins. As a result, the cooling water flowing to the heat exchanger 35*b* through the cooling water passage 60 is cooled (heat is removed), and the air around the heat exchanger 35*b* is heated.

Further, the radiator fan 35*f* is rotatably driven by the power of the fan motor 35*a* to suck in the ambient air and blow cooling air to the heat exchanger 35*b*. As a result, the heat exchanger 35*b* is cooled, and the performance of cooling the cooling water by the heat exchanger 35*b* is enhanced. The radiator 35 and the cooling water passage 60 are a radiator device that cools the cooling water and the electric devices 30, 40, 38, and 9. The cooling water and the electric devices 30, 40, 38, and 9 are objects to be cooled by the radiator 35 and the cooling water passage 60.

The heating path included in the working machine 1 includes a first flow passage 71 and a second flow passage 72 through which warm air flows.

One end of the first flow passage 71 communicates with the inside (the operator's cab 4R) of the protection mechanism 6. The other end of the first flow passage 71 branches into two passages. One of the passages at the other end of the first flow passage 71 communicates with the exhaust side of the oil cooler fan 37*f* of the oil cooler 37. The other passage at the other end of the first flow passage 71 communicates with the exhaust side of the radiator fan 35*f* of the radiator 35. Releasing/non-releasing switching mechanisms 76*b* and 76*c* are disposed closer to the oil cooler 37 and the radiator 35 than the branch point of the first flow passage 71, respectively. The fans 75*a* and 75*b*, a releasing/non-releasing switching mechanism 76*a*, the electric heater 42, and a cooling/heating switching mechanism 77 are disposed closer to the protection mechanism 6 than the branch point of the first flow passage 71.

The first flow passage 71 is a flow passage for taking in air heated by heat exchange with the cooling water or the hydraulic fluid by the heat exchangers 35*b* and 37*b* of the radiator 35 and the oil cooler 37, guiding the air to the electric heater 42, and guiding the air further heated by the electric heater 42 to the inside (the operator's cab 4R) of the protection mechanism 6.

The oil cooler fan 37*f* blows cooling air to the heat exchanger 37*b* on the intake side of the oil cooler fan 37*f*, and also blows ambient air heated by the heat exchanger 37*b* to the first flow passage 71. The radiator fan 35*f* blows cooling air to the heat exchanger 35*b* on the intake side of the fan 35*f*, and also blows ambient air heated by the heat exchanger 35*b* to the first flow passage 71. That is, the oil cooler fan 37*f* and the radiator fan 35*f* are a multiple-purpose fan for blowing cold air and blowing warm air.

As another example, the heat exchanger 37*b* of the oil cooler 37 may be disposed on the exhaust side of the oil cooler fan 37*f*, and the air blown from the oil cooler fan 37*f* and heated in the heat exchanger 37*b* may be sent to the first flow passage 71. Further, the heat exchanger 35*b* of the radiator 35 may be disposed on the exhaust side of the radiator fan 35*f*, and the air blown from the radiator fan 35*f* and heated in the heat exchanger 35*b* may be sent to the first flow passage 71.

The fan 75*a* is disposed in the first flow passage 71 between the branch point and the releasing/non-releasing switching mechanism 76*a*. The fan 75*a* is rotatably driven by the power of the corresponding warm-air fan motor 45 (FIG. 1) to blow air flowing through the first flow passage 71 toward the releasing/non-releasing switching mechanism 76*a*.

The electric heater 42 is disposed in the first flow passage 71 between the releasing/non-releasing switching mechanism 76*a* and the cooling/heating switching mechanism 77. The heating wire 42*a* of the electric heater 42 is driven (generates heat) by the electric power of the low-voltage battery 33 to heat air flowing through the first flow passage 71. The fan 42*f* of the electric heater 42 is rotatably driven by the power of the fan motor 42*b* (FIG. 1) to blow the air flowing through the first flow passage 71 toward the cooling/heating switching mechanism 77.

The fan 75*b* is disposed between one end of the first flow passage 71 and the cooling/heating switching mechanism 77. The fan 75*b* is rotatably driven by the power of the corresponding warm-air fan motor 45 (FIG. 1) to blow air flowing through the first flow passage 71 toward the inside of the protection mechanism 6 and convect the air in the protection mechanism 6.

The plurality of fans 35*f*, 37*f*, 75*a*, 42*f*, and 75*b* described above are air blowers that blow air heated by the heat exchangers 35*b* and 37*b* of the radiator 35 and the oil cooler 37 to the inside of the protection mechanism 6 through the first flow passage 71.

The releasing/non-releasing switching mechanism 76*a* is disposed between the first flow passage 71 and a third flow passage 73*a*. The third flow passage 73*a* is a flow passage for discharging air from the first flow passage 71 to the outside of the machine body 2. The releasing/non-releasing switching mechanism 76*a* includes, for example, one or more dampers, a mechanism for moving the dampers, and so on and is switchable between a releasing state and a non-releasing state.

The releasing/non-releasing switching mechanism 76*a* is switched to the releasing state, thereby blocking the flow of air from the fan 75*a* of the first flow passage 71 to the electric heater 42 (toward the inside of the protection mechanism 6) (the closed state of the first flow passage 71) and guiding air from the fan 75*a* of the first flow passage 71 to the third flow passage 73*a* (the open state of the third flow passage 73*a*). As a result, the air is released to the outside of the machine body 2. The releasing/non-releasing switching mechanism 76*a* is switched to the non-releasing state, thereby blocking the flow of air from the fan 75*a* of the first flow passage 71 to the third flow passage 73*a* (the closed state of the third flow passage 73*a*) and guiding air from the fan 75*a* of the first flow passage 71 to the electric heater 42 (toward the inside of the protection mechanism 6) (the open state of the first flow passage 71).

The cooling/heating switching mechanism 77 is disposed between the first flow passage 71 and a fourth flow passage 74. The fourth flow passage 74 is a flow passage for guiding cold air blown from the electric cooler 46 to the first flow passage 71. The cooling/heating switching mechanism 77 includes, for example, one or more dampers, a mechanism for moving the dampers, and so on and is switchable between a cooling state and a heating state.

The cooling/heating switching mechanism 77 is switched to the cooling state, thereby blocking the flow of air from the electric heater 42 of the first flow passage 71 to the inside of the protection mechanism 6 (the closed state of the first flow passage 71) and guiding air (cold air) blown from the electric cooler 46 to the fourth flow passage 74 to the inside of the protection mechanism 6 through the fan 75*b* of the first flow passage 71. The cooling/heating switching mechanism 77 is switched to the heating state, thereby blocking the flow of air from the electric cooler 46 to the inside of the protection mechanism 6 through the flow passages 74 and 71 and guiding air (warm air) from the electric heater 42 of the first flow passage 71 to the inside of the protection mechanism 6 (the open state of the first flow passage 71).

One end of the second flow passage 72 communicates with the inside of the protection mechanism 6. The other end of the second flow passage 72 branches into two passages. An inside/outside air switching mechanism 78 is disposed at a branch point of the second flow passage 72. One of the passages at the other end of the second flow passage 72 communicates with the intake side of the oil cooler fan 37*f* of the oil cooler 37. The other passage at the other end of the second flow passage 72 communicates with the intake side of the radiator fan 35*f* of the radiator 35. The second flow passage 72 is a flow passage for taking in air inside the protection mechanism 6 and guiding the air to the intake side of the radiator fan 35*f* and the oil cooler fan 37*f* The inside/outside air switching mechanism 78 is connected to fifth flow passages 79*a* and 79*b* communicating with the outside of the machine body 2.

The fan 75*c* is disposed closer to the protection mechanism 6 than the inside/outside air switching mechanism 78 in the second flow passage 72. The fan 75*c* is rotatably driven by the power of the corresponding warm-air fan motor 45 (FIG. 1) to blow the air inside the protection mechanism 6 toward the inside/outside air switching mechanism 78 through the second flow passage 72. The inside/outside air switching mechanism 78 includes, for example, one or more dampers, a mechanism for moving the dampers, and so on and is switchable between an inside-air circulation state and an outside-air introduction state.

The inside/outside air switching mechanism 78 is switched to the inside-air circulation state, thereby guiding the air inside the protection mechanism 6 to the radiator 35 and the oil cooler 37 through the second flow passage 72 (the fully opened state of the second flow passage 72). The air flowing to the radiator 35 and the oil cooler 37 through the second flow passage 72 is blown to the first flow passage 71 by the radiator fan 35*f* and the oil cooler fan 37*f*.

The inside/outside air switching mechanism 78 is switched to the outside-air introduction state, thereby blocking the flow of air from the second flow passage 72 to the radiator 35 and the oil cooler 37 (the closed state of the second flow passage 72). At this time, the air flowing to the inside/outside air switching mechanism 78 through the second flow passage 72 may be discharged to the outside through one fifth flow passage 79*a*, or the outside air may be guided to the radiator 35 and the oil cooler 37 through the other fifth flow passage 79*b*, the inside/outside air switching mechanism 78, and the second flow passage 72.

Alternatively, the inside/outside air switching mechanism 78 may be switchable to a one-side inside-air circulation state in which the air inside the protection mechanism 6 is guided to either the radiator 35 or the oil cooler 37 through the second flow passage 72. Specifically, for example, the inside/outside air switching mechanism 78 is switched to the inside-air circulation state in which the air inside the protection mechanism 6 is guided to the oil cooler 37 through the second flow passage 72, thereby blocking the flow of air from the second flow passage 72 to the radiator 35. The inside/outside air switching mechanism 78 is switched to the inside-air circulation state in which the air inside the protection mechanism 6 is guided to the radiator 35 through the second flow passage 72, thereby blocking the flow of air from the second flow passage 72 to the oil cooler 37.

A third flow passage 73b is disposed on the exhaust side of the oil cooler fan 37f of the oil cooler 37. The third flow passage 73b is a flow passage for discharging air from the oil cooler 37 to the outside of the machine body 2. The third flow passage 73b is provided with the releasing/non-releasing switching mechanism 76b. The releasing/non-releasing switching mechanism 76b includes, for example, one or more dampers, a mechanism for moving the dampers, and so on and is switchable between a releasing state and a non-releasing state.

The releasing/non-releasing switching mechanism 76b is switched to the releasing state, thereby blocking the flow of air from the oil cooler 37 to the first flow passage 71 and guiding air from the oil cooler 37 to the third flow passage 73b (the open state of the third flow passage 73b) to release air blown by the oil cooler fan 37f to the outside of the machine body 2. The releasing/non-releasing switching mechanism 76b is switched to the non-releasing state, thereby blocking the flow of air from the oil cooler 37 to the third flow passage 73b (the closed state of the third flow passage 73b) and guiding air from the oil cooler 37 to the first flow passage 71 to allow air blown by the oil cooler fan 37f to flow into the first flow passage 71.

A third flow passage 73c is disposed on the exhaust side of the radiator fan 35f of the radiator 35. The third flow passage 73c is a flow passage for discharging air from the radiator 35 to the outside of the machine body 2. The third flow passage 73c is provided with the releasing/non-releasing switching mechanism 76c. The releasing/non-releasing switching mechanism 76c includes, for example, one or more dampers, a mechanism for moving the dampers, and so on and is switchable between a releasing state and a non-releasing state.

The releasing/non-releasing switching mechanism 76c is switched to the releasing state, thereby blocking the flow of air from the radiator 35 to the first flow passage 71 and guiding air from the radiator 35 to the third flow passage 73c (the open state of the third flow passage 73c) to release air blown by the radiator fan 35f to the outside of the machine body 2. The releasing/non-releasing switching mechanism 76c is switched to the non-releasing state, thereby blocking the flow of air from the radiator 35 to the third flow passage 73c (the closed state of the third flow passage 73c) and guiding air from the radiator 35 to the first flow passage 71 to allow air blown by the radiator fan 35f to flow into the first flow passage 71.

Each of the flow passages 71 to 74 described above includes a duct, for example. As another example, the flow passages 71 to 74 may be spaces formed by partitioning the inside of the machine body 2 with a plurality of wall bodies. While each of the switching mechanisms 76a, 76b, 76c, 77, and 78 includes at least one damper, a moving mechanism for the damper, and so on, each of the switching mechanisms 76a, 76b, 76c, 77, and 78 may include another valve body, a mechanism for activating the valve body, and so on.

To heat the inside of the protection mechanism 6, the electric heater 42 is driven, the heating wire 42a generates heat, and the fan 42f is rotatably driven. Further, for example, the releasing/non-releasing switching mechanisms 76a, 76b, and 76c are switched to the non-releasing state, and the cooling/heating switching mechanism 77 is switched to the heating state. The inside/outside air switching mechanism 78 may be switched to the inside-air circulation state or may be switched to the outside-air introduction state. Further, the fans 75a, 75b, 75c, 35f, and 37f are rotatably driven. The radiator fan 35f and the oil cooler fan 37f may be rotatably driven at all times when the working machine 1 is started.

With the configuration described above, the ambient air heated by the cooling water in the heat exchanger 35b of the radiator 35 is blown to the first flow passage 71 by the radiator fan 35f. The ambient air heated by the hydraulic fluid in the heat exchanger 37b of the oil cooler 37 is blown to the first flow passage 71 by the oil cooler fan 37f. Then, the warm air flowing into the first flow passage 71 is also blown by the fan 75a and flows to the electric heater 42 through the releasing/non-releasing switching mechanism 76a. The air is further heated by the electric heater 42, and the air is further blown by the fans 42f and 75b and flows into the protection mechanism 6 through the cooling/heating switching mechanism 77. As a result, the inside of the protection mechanism 6 is heated.

The warm air inside the protection mechanism 6 is taken into the second flow passage 72 by the fan 75c and flows through the second flow passage 72. When the inside/outside air switching mechanism 78 is in the inside-air circulation state, the air flowing through the second flow passage 72 passes through the inside/outside air switching mechanism 78 and flows to the intake side of the radiator fan 35f of the radiator 35 and the oil cooler fan 37f of the oil cooler 37. The air on the intake side of the fans 35f and 37f, that is, the air around the heat exchangers 35b and 37b, is blown again to the first flow passage 71 by the radiator fan 35f and the oil cooler fan 37f. That is, the air heated by the heat exchangers 35b and 37b and the electric heater 42 repeatedly circulates through the heat exchangers 35b and 37b, the electric heater 42, and the inside of the protection mechanism 6 to heat the inside of the protection mechanism 6 (inside-air circulation heating state).

When the inside/outside air switching mechanism 78 is in the outside-air introduction state, the air flowing through the second flow passage 72 is discharged to the outside through the inside/outside air switching mechanism 78 and the fifth flow passage 79a, and instead, the outside air is introduced to the intake side of the radiator fan 35f of the radiator 35 and the oil cooler fan 37f of the oil cooler 37 through the fifth flow passage 79a, the inside/outside air switching mechanism 78, and the second flow passage 72. The air on the intake side of the fans 35f and 37f, that is, the ambient air heated by the heat exchangers 35b and 37b and the outside air, is blown to the first flow passage 71 by the radiator fan 35f and the oil cooler fan 37f. That is, the air heated by the heat exchangers 35b and 37b and the electric heater 42 does not repeatedly circulate through the heat exchangers 35b and 37b, the electric heater 42, and the inside of the protection mechanism 6, but the outside air is introduced to heat the inside of the protection mechanism 6 (outside-air introduction heating state).

As another example, during heating of the inside of the protection mechanism 6, the inside/outside air switching mechanism 78 may be switched to the one-side inside-air circulation state described above, and air heated by a heat exchanger among the heat exchangers 35b and 37b of the radiator 35 and the oil cooler 37 and by the electric heater 42 may repeatedly circulate through the heat exchanger, the electric heater 42, and the inside of the protection mechanism 6.

During non-heating of the inside of the protection mechanism 6, at least the releasing/non-releasing switching mechanisms 76a, 76b, and 76c are switched to the releasing state, and the fan 75a is rotatably driven. Accordingly, the air around the heat exchangers 35b and 37b is blown to the third flow passages 73c and 73b by the fans 35f and 37f, and is discharged to the outside of the machine body 2 through the releasing/non-releasing switching mechanisms 76c and 76b. The air around the heat exchangers 35b and 37b is also blown to the first flow passage 71 by the fans 35f and 37f, and is discharged to the outside of the machine body 2 through the releasing/non-releasing switching mechanism 76a and the third flow passage 73a.

To cool the inside of the protection mechanism 6, the electric cooler 46 is driven, and the electric heater 42 is stopped. Further, at least the cooling/heating switching mechanism 77 is switched to the cooling state, and the fan 75b is rotatably driven. Accordingly, cold air blown from the electric cooler 46 passes through the fourth flow passage 74 and the cooling/heating switching mechanism 77 and is blown to the inside of the protection mechanism 6 by the fan 75b. As a result, the inside of the protection mechanism 6 is cooled.

The heating and cooling of the inside of the protection mechanism 6 may be turned on (performed) or turned off (stopped) in response to, for example, an operator performing a predetermined operation with the operation switch 5b (FIG. 1) of the operation device 5. In this case, the controller 7 (FIG. 1, mainly, the CPU 7a) detects a predetermined operation of the operation switch 5b and drives or stops the electric heater 42, the electric cooler 46, and the fans 35f, 37f, 42f, 75a, 75b, and 75c.

The states of the switching mechanisms 76a, 76b, 76c, 77, and 78 may be switched manually or automatically. In the case of manual switching, for example, the operator operates operation knobs (not illustrated) corresponding to the switching mechanisms 76a, 76b, 76c, 77, and 78 to switch the states of the switching mechanisms 76a, 76b, 76c, 77, and 78. As another example, the operator may perform a predetermined operation with the operation switch 5b, thereby allowing the controller 7 to detect the operation and activate an electric or hydraulic actuator (not illustrated) to switch the states of the switching mechanisms 76a, 76b, 76c, 77, and 78 by the driving force of the actuator.

As another example, the controller 7 may control the operation of the electric heater 42, the electric cooler 46, the fans 35f, 37f, 42f, 75a, 75b, and 75c, or the switching mechanisms 76a, 76b, 76c, 77, and 78 based on the room temperature inside the protection mechanism 6 detected by the room temperature detector 48 (FIG. 1), the fluid temperature of the hydraulic fluid detected by the fluid temperature detector 47, the water temperature of the cooling water detected by the water temperature detector 49, the remaining power level of the low-voltage battery 33 detected by the power level detector 34, or the like.

As described above, the electric heater 42, the electric cooler 46, the fans 35f, 37f, 42f, 75a, 75b, and 75c, or the switching mechanisms 76a, 76b, 76c, 77, and 78 are driven by the electric power of the low-voltage battery 33. Alternatively, these components may be driven by the electric power of the battery unit 30 (FIG. 1). The configuration of the electric heater 42 is not limited to the configuration described above, and may be any configuration capable of heating the inside of the protection mechanism 6 by being driven by electric power.

The number of fans disposed in the first flow passage 71 and the second flow passage 72 is not limited to the number illustrated in FIG. 3, and may be appropriately set in accordance with, for example, the length, cross-sectional area, routing, and the like of each of the flow passages 71 and 72. The fan 75c in the second flow passage 72 may be omitted. Alternatively, the third flow passages 73a, 73b, and 73c, the fourth flow passage 74, and the fifth flow passages 79a and 79b may also be provided with an appropriate number of fans.

Next, the layout of components in the machine body 2 of the working machine 1 according to the first embodiment will be described.

Figure 4:
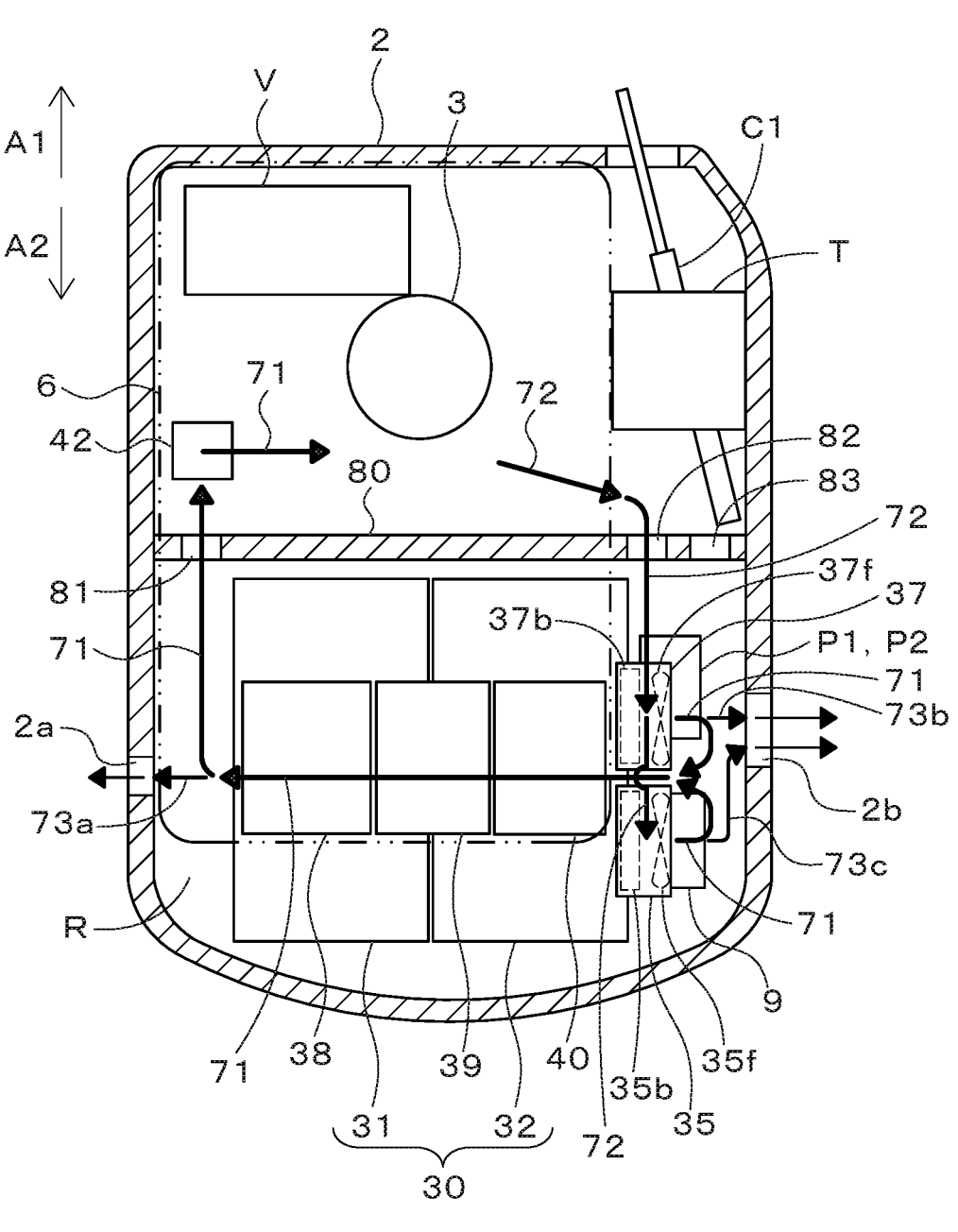
FIG. 4 is a diagram illustrating an example layout of components in a machine body of the working machine according to the first embodiment.

FIG. 4 is a diagram illustrating an example layout of components in the machine body 2 of the working machine 1. FIG. 4 illustrates the inside of the machine body 2 when viewed from above.

In the machine body 2, the control valve unit V is arranged in front (in the A1 direction) of the swivel bearing 3. The hydraulic fluid tank T is arranged to the right of the swivel bearing 3 above the swing cylinder C1. A partition plate 80 is disposed behind (in the A2 direction of) the swivel bearing 3 in parallel with the width direction of the machine body 2. The partition plate 80 partitions an internal space of the machine body 2 into front and rear portions.

A rear room R is disposed behind (in the A2 direction of) the partition plate 80. The rear room R includes the battery unit 30, the inverter 38, the junction box 39, the DC-DC converter 40, the hydraulic pumps P1 and P2, the electric motor 9, the radiator 35, the oil cooler 37, and so on.

The battery packs 31 and 32 of the battery unit 30 are arranged side by side in the width direction of the machine body 2. The inverter 38, the junction box 39, and the DC-DC converter 40 are arranged above the battery packs 31 and 32.

The hydraulic pumps P1 and P2, the electric motor 9, the radiator 35, and the oil cooler 37 are arranged to the right of the battery unit 30. The electric motor 9 is arranged behind the hydraulic pumps P1 and P2. The radiator 35 is arranged above the electric motor 9. The heat exchanger 35b of the radiator 35 is arranged closer to the battery unit 30 than the radiator fan 35f. The oil cooler 37 is arranged above the hydraulic pumps P1 and P2. The heat exchanger 37b of the oil cooler 37 is arranged closer to the battery unit 30 than the oil cooler fan 37f.

The partition plate 80 has formed therein a plurality of through-holes 81, 82, and 83. The electric heater 42 is arranged in front of the left through-hole 81. A hose (not illustrated) or the like, which forms the fluid passage 50, is inserted into the right through-hole 83. The protection mechanism 6 (the operator's cab 4R) is mounted above the machine body 2.

The first flow passage 71, the second flow passage 72, and the third flow passages 73a, 73b, and 73c illustrated in FIG. 3 are provided, for example, as indicated by thick arrows in FIG. 4.

Specifically, in FIG. 4, portions of the first flow passage 71 extend in the right direction from the exhaust side (to the right in FIG. 4) of the radiator fan 35f and from the exhaust side of the oil cooler fan 37f, and thereafter bend and merge. The first flow passage 71 then rises and extends above the battery unit 30, the DC-DC converter 40, the junction box 39, and the inverter 38. Thereafter, the first flow passage 71 extends downward on the left side of the battery unit 30 and then turns to the front A1. Next, the first flow passage 71 extends to the front A1, passes through the through-hole 81 in the partition plate 80, and reaches the electric heater 42. Then, the first flow passage 71 rises from the electric heater 42, exits the inside of the machine body 2, and reaches the inside of the protection mechanism 6.

The first flow passage 71 provided in the manner described above allows not only the air heated in the heat exchangers 35b and 37b and heat of the air but also the ambient air directly heated by the hydraulic pumps P1 and P2, the electric motor 9, the battery unit 30, the DC-DC converter 40, the junction box 39, or the inverter 38 and heat of the air to move to the inside of the protection mechanism 6 through the electric heater 42 to heat the inside of the protection mechanism 6.

The second flow passage 72 extends downward from the inside of the protection mechanism 6, enters the inside of the machine body 2, turns to the rear A2, and passes through the through-hole 82 in the partition plate 80. Then, the second flow passage 72 extends to the rear A2 and branches into two passages above (or below) the oil cooler 37 and the radiator 35. One of the passages reaches the intake side (to the left in FIG. 4) of the radiator fan 35f, and the other passage reaches the intake side of the oil cooler fan 37f.

The second flow passage 72 provided in the manner described above allows the air and heat inside the protection mechanism 6 to return to the intake side of the fans 35f and 37f As a result, warm air passes through the first flow passage 71 and the second flow passage 72 and circulates through the heat exchangers 35b and 37b, the electric heater 42, and the inside of the protection mechanism 6. Further, the warm air inside the protection mechanism 6 is blown to the heat exchangers 35b and 37b. As a result, the cooling water and the hydraulic fluid are heated in the heat exchangers 35b and 37b. Accordingly, for example, in a low-temperature environment, the electric devices 30, 40, 39, 38, and 9 and the hydraulic devices P1, P2, V (V1 to V8), C1 to C5, ML, MR, MT, 58, and PV1 to PV6 are warmed up by the cooling water or the hydraulic fluid, and the time taken for the working device 20 and the traveling device 10 to be normally activated is shortened.

The third flow passage 73a extends to the left from the left side of the battery unit 30 and reaches a vent 2a formed in the left side surface of the machine body 2. The third flow passage 73b extends to the right from the exhaust side of the oil cooler fan 37f and reaches a vent 2b formed in the right side surface of the machine body 2. The third flow passage 73c extends to the right from the exhaust side of the radiator fan 35f, and then turns to the front A1. The third flow passage 73c further turns to the right and reaches the vent 2b. The third flow passages 73a, 73b, and 73c provided in the manner described above allow the air and heat in the rear room R to be discharged to the outside from the vents 2a and 2b of the machine body 2 during non-heating of the inside of the protection mechanism 6.

Working machines 1 according to the first embodiment achieve the following effects.

A working machine 1 according to a first embodiment includes: a machine body 2; a protection mechanism 6 to protect an operator's seat 4 on the machine body 2; a heater 42 to heat an inside of the protection mechanism 6; a radiator device 35, 37 to cool an object to be cooled, the radiator device 35, 37 including a heat exchanger 35b, 37b to perform heat exchange between the object and ambient air; and a first flow passage 71 to guide air heated by the heat exchanger 35b, 37b to the heater 42 and to guide the air further heated by the heater 42 to the inside of the protection mechanism 6. With this configuration, in the working machine 1, the air heated in the heat exchanger(s) 35b and/or 37b of the radiator device(s) 35 and/or 37 is used to heat the inside of the protection mechanism 6, making it possible to improve energy efficiency. Furthermore, the air heated by the heat exchanger(s) 35b and/or 37b is further heated by the heater 42 and then guided to the inside of the protection mechanism 6, making it possible to sufficiently heat the inside of the protection mechanism 6.

The heater 42 may be operable to be driven by electric power from a storage battery 30, 33 provided in or on the machine body 2 to heat air flowing in the first flow passage 71. Even when such an electric heater 42 is used, the inside of the protection mechanism 6 is heated not only by the electric heater 42 but also by using the air heated by the heat exchanger(s) 35b and/or 37b of the radiator device(s) 35 and/or 37. This makes it possible to sufficiently heat the inside of the protection mechanism 6 with high energy efficiency and to reduce the power consumption of the storage batteries 30 and 33, ensuring long-time operation of the components of the working machine 1.

The working machine 1 may further include an air blower 35f, 37f, 75a, 42f, 75b to blow the air heated by the heat exchanger 35b, 37b to the inside of the protection mechanism 6 through the first flow passage 71. This configuration makes it possible to send the air heated by the heat exchanger(s) 35b and/or 37b into the heater 42 through the first flow passage 71 and to send the air further heated by the heater 42 into the inside of the protection mechanism 6.

The air blower 35f, 37f, 75a, 42f, 75b may include a multiple-purpose fan 35f, 37f to blow cooling air to the radiator device 35, 37 and to blow the ambient air heated by the radiator device 35, 37 to the first flow passage 71. This configuration makes it possible to both cool the object to be cooled and heat the inside of the protection mechanism 6.

The working machine 1 may further include a second flow passage 72 to guide air inside the protection mechanism 6 to the radiator device 35, 37. This configuration allows warm air to circulate through the heat exchanger(s) 35b and/or 37b of the radiator device(s) 35 and/or 37, the heater 42, and the inside of the protection mechanism 6 along the first flow passage 71 and the second flow passage 72, and makes it possible to heat the inside of the protection mechanism 6 with higher energy efficiency. Furthermore, the warm air inside the protection mechanism 6 is guided to the intake side of the fan(s) 35f and/or 37f through the second flow passage 72, making it possible to heat the object to be cooled with the warm air in, for example, a low-temperature environment to maintain the functions and performances of the object to be cooled.

The working machine 1 may further include an inside/outside air switching mechanism 78 switchable between an inside-air circulation state in which the air inside the protection mechanism 6 is guided to the radiator device 35, 37 through the second flow passage 72 and an outside-air introduction state in which a flow of the air from the second flow passage 72 to the radiator device 35, 37 is blocked and outside air is guided to the radiator device 35, 37. This configuration makes it possible to switch between the inside-air circulation heating state in which warm air is circulated through the heat exchanger(s) 35b and/or 37b, the heater 42, and the inside of the protection mechanism 6 to heat the inside of the protection mechanism 6 and the outside-air introduction heating state in which outside air is introduced to heat the inside of the protection mechanism 6, as necessary.

The working machine 1 may further include: a cooler 46 to cool the inside of the protection mechanism 6; and a cooling/heating switching mechanism 77 switchable between a heating state in which a flow of air from the cooler 46 to the inside of the protection mechanism 6 is blocked and air heated by the heater 42 is guided to the inside of the protection mechanism 6 and a cooling state in which a flow of air from the heater 42 to the inside of the protection mechanism 6 is blocked and cool air blown from the cooler 46 is guided to the inside of the protection mechanism 6. This configuration makes it possible to switch between heating and cooling of the inside of the protection mechanism 6.

The working machine 1 may further include: a third flow passage 73*c*, 73*b*, 73*a* to release air from the radiator device 35, 37 or the first flow passage 71 to outside of the working machine 1; and a releasing/non-releasing switching mechanism 76*c*, 76*b*, 76*a* switchable between a releasing state in which a flow of air from the radiator device 35, 37 to the first flow passage 71 or from the first flow passage 71 to the inside of the protection mechanism 6 is blocked and air is guided from the radiator device 35, 37 or the first flow passage 71 to the third flow passage 73*c*, 73*b*, 73*a* and a non-releasing state in which a flow of air from the radiator device 35, 37 or the first flow passage 71 to the third flow passage 73*c*, 73*b*, 73*a* is blocked and air is guided from the radiator device 35, 37 to the first flow passage 71 or from the first flow passage 71 to the inside of the protection mechanism 6. With this configuration, the air heated by the heat exchanger(s) 35*b* and/or 37*b* of the radiator device(s) 35 and/or 37 can be discharged to the outside of the machine body 2 or sent to the heater 42 or the inside of the protection mechanism 6, as necessary.

The working machine 1 may further include hydraulic device(s) (hydraulic pump(s) P1 and/or P2, a control valve unit V, control valve(s) V1 to V8, hydraulic actuator(s) C1 to C5, ML, MR, and MT, an unloading valve 58, and/or operation valve(s) PV1 to PV6) to be driven by hydraulic fluid, and the radiator device(s) 35 and/or 37 includes an oil cooler 37 to cool hydraulic fluid which is the object to be cooled. With this configuration, the hydraulic fluid heated by the hydraulic device(s) can be cooled by the oil cooler 37. Furthermore, the air heated by the heat of the hydraulic fluid in the oil cooler 37 is sent to the heater 42 and the inside of the protection mechanism 6 through the first flow passage 71, making it possible to sufficiently heat the inside of the protection mechanism 6 with high energy efficiency.

The working machine 1 may further include electric device(s) (electric motor 9, inverter 38, battery unit 30, and/or DC-DC converter 40), and the radiator device(s) 35, 37 may include a cooling water passage 60 to allow cooling water for cooling the electric device(s) to flow, and a radiator 35 to cool the cooling water which is the object to be cooled. With this configuration, the cooling water heated by the electric device(s) can be cooled by the radiator 35. Furthermore, the air heated by the heat of the cooling water in the radiator 35 is sent to the heater 42 and the inside of the protection mechanism 6 through the first flow passage 71, making it possible to sufficiently heat the inside of the protection mechanism 6 with high energy efficiency.

In the embodiment illustrated in FIG. 3, the air heated by both the heat exchangers 35*b* and 37*b* of the radiator 35 and the oil cooler 37, which are a radiator device, is blown to the inside of the protection mechanism 6 through the heater 42 through the first flow passage 71. However, the air heated by one of the heat exchangers 35*b* and 37*b* of the radiator 35 and the oil cooler 37 may be blown to the inside of the protection mechanism 6 through the heater 42 through the first flow passage 71.

The electric devices to be cooled by the radiator device(s) include at least one of the following: the storage battery (battery unit) 30; the electric motor 9; the motor driver (inverter) 38 that drives the electric motor 9 by the electric power of the storage battery 30; and the voltage conversion circuit (DC-DC converter) 40 that converts a voltage of the storage battery 30 into a different voltage. With this configuration, the heat of the cooling water heated by the electric devices 30, 9, 38, and 40 heats the air around the heat exchanger 35*b* of the radiator 35, and the heat of the air can be used to sufficiently heat the inside of the protection mechanism 6 with high energy efficiency.

Next, a heating system H1 included in the working machine 1 according to a second embodiment will be described.

Figure 5:
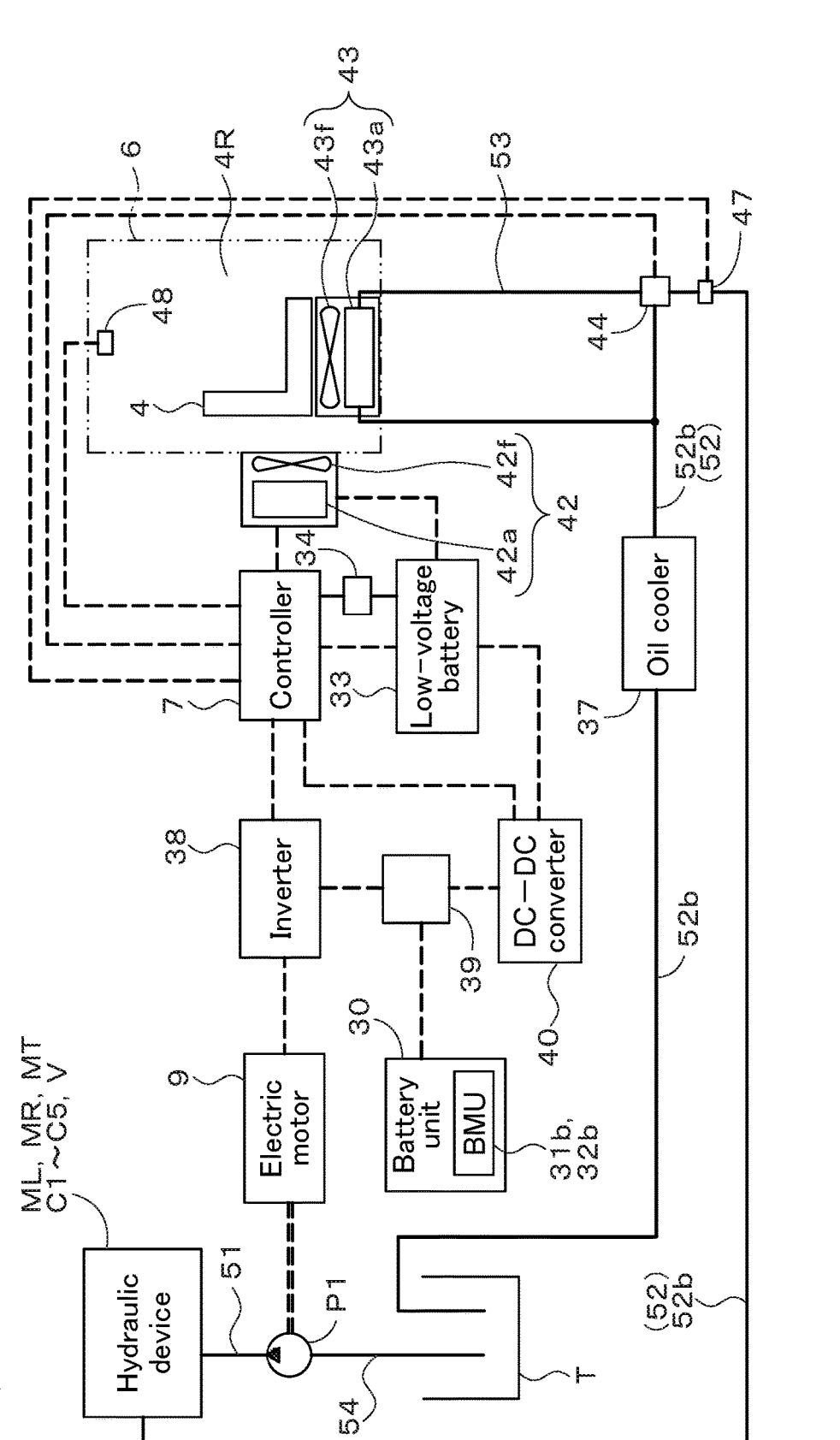
FIG. 5 is a configuration diagram of an example of a heating system of a working machine according to a second embodiment.

FIG. 5 is a configuration diagram of an example of the heating system H1 included in the working machine 1 according to the second embodiment.

The heating system H1 is a system for heating the inside of the protection mechanism 6. In the heating system H1, the thermal fluid heater 43 is disposed in a third fluid passage 53 through which the hydraulic fluid flows. The third fluid passage 53 is included in the fluid passage 50 illustrated in FIG. 2. As illustrated in FIG. 5, the third fluid passage 53 branches off from the discharge fluid passage 52*b* of the second fluid passage 52 through which the hydraulic fluid flows after having passed through one of the control valves V1 to V8 (FIG. 2) of the control valve unit V. The third fluid passage 53 passes through the inside (the operator's cab 4R) of the protection mechanism 6 and merges with the discharge fluid passage 52*b*. The third fluid passage 53 is connected to the discharge fluid passage 52*b* at a location closer to the control valve unit V (the control valves V1 to V8) than the oil cooler 37 is.

The thermal fluid heater 43 includes a heat exchanger 43*a* and a first fan 43*f* The heat exchanger 43*a* is formed of a material such as a metal having high thermal conductivity, for example. The heat exchanger 43*a* includes a tube through which the hydraulic fluid flows and a plurality of fins disposed around the tube (not illustrated in detail). The hydraulic fluid flows from one end to the other end of the tube of the heat exchanger 43*a*, whereby heat exchange is performed between the hydraulic fluid and the air around the tube and the fins. As a result, the hydraulic fluid flowing from the third fluid passage 53 into the heat exchanger 43*a* is cooled, and the air around the heat exchanger 43*a* is heated.

The first fan 43*f* is rotatably driven by the power of the fan motor 43*b* (FIG. 1) to blow the air around the fins of the heat exchanger 43*a* toward the inside (the operator's cab 4R) of the protection mechanism 6. That is, the air heated by heat exchange with the hydraulic fluid in the heat exchanger 43*a* is sent into the protection mechanism 6 by the first fan 43*f* to heat the inside of the protection mechanism 6. The controller 7 controls the driving of the fan motor 43*b* to rotatably drive or stop the first fan 43*f* In FIG. 5, the thermal fluid heater 43 is disposed inside the protection mechanism 6. Alternatively, the thermal fluid heater 43 may be disposed outside the protection mechanism 6.

The switching valve 44 is disposed at a branch point of the third fluid passage 53 from the discharge fluid passage 52*b*. The switching valve 44 is switchable between a first position in which the hydraulic fluid flowing through the discharge fluid passage 52*b* is allowed to flow to the third fluid passage 53 and a second position in which the hydraulic fluid is blocked to the third fluid passage 53.

The controller 7 controls the junction box 39 to supply the electric power of the battery unit 30 to the inverter 38. The controller 7 further controls the inverter 38 to drive the electric motor 9, and drives the hydraulic pumps P1 and P2 by the power of the electric motor 9.

The hydraulic fluid delivered from the hydraulic pump P1 flows toward the control valve unit V included in the hydraulic devices through the first fluid passage 51. The hydraulic fluid that has passed through one of the control valves V1 to V8 of the control valve unit V passes through the second fluid passage 52 and flows to the oil cooler 37 through one of the hydraulic actuators C1 to C5, ML, MR, and MT included in the hydraulic devices or through the switching valve 44 without passing through any of the hydraulic actuators C1 to C5, ML, MR, and MT.

At this time, for example, the controller 7 energizes a solenoid of a solenoid valve included in the switching valve 44 to switch the switching valve 44 to the first position, and causes the hydraulic fluid to flow to the third fluid passage 53. The controller 7 also controls the driving of the fan motor 43b by using the motor drive circuit for the fan motor 43b to rotatably drive the first fan 43f As a result, the hydraulic fluid heated at least by the hydraulic pump P1 and the control valves V1 to V8 of the control valve unit V (in some cases, also by the hydraulic actuators ML, MR, MT, and C1 to C5) flows through the third fluid passage 53 and passes through the heat exchanger 43a of the thermal fluid heater 43, and heat exchange is performed between the hydraulic fluid and the ambient air. The heated air is blown to the inside (the operator's cab 4R) of the protection mechanism 6 to heat the inside of the protection mechanism 6.

By contrast, for example, the controller 7 deenergizes the solenoid of the solenoid valve included in the switching valve 44 to switch the switching valve 44 to the second position, and blocks the hydraulic fluid to the third fluid passage 53. At the same time, the controller 7 controls the driving of the fan motor 43b to stop the first fan 43f. As a result, the hydraulic fluid flows to the oil cooler 37 through the second fluid passage 52 without flowing through the third fluid passage 53, and the heating of the inside of the protection mechanism 6 by the thermal fluid heater 43 is stopped. That is, as described above, the controller 7 controls execution and stop of the operation of heating the inside of the protection mechanism 6 using the thermal fluid heater 43.

The fluid temperature detector 47 is disposed between a junction with the third fluid passage 53 and the hydraulic devices ML, MR, MT, C1 to C5, and V in the first fluid passage 51. The fluid temperature detector 47 is disposed closer to the hydraulic devices ML, MR, MT, C1 to C5, and V than the branch point of the third fluid passage 53 from the discharge fluid passage 52b of the second fluid passage 52. The fluid temperature detector 47 detects the fluid temperature of the hydraulic fluid flowing through the discharge fluid passage 52b and outputs the detection result to the controller 7. As another example, the fluid temperature detector 47 may be disposed in the discharge fluid passage 52b between a junction with the third fluid passage 59 and the oil cooler 37, between the oil cooler 37 and the hydraulic fluid tank T, or in the first fluid passage 51 or the hydraulic fluid tank T to detect the fluid temperature of the hydraulic fluid flowing through the fluid passage.

The controller 7 controls the junction box 39 and the DC-DC converter 40 to charge the low-voltage battery 33 with the electric power of the battery unit 30. Further, the controller 7 is driven by the electric power of the low-voltage battery 33. The power level detector 34 detects the remaining power level of the low-voltage battery 33 and outputs the result to the controller 7.

The electric heater 42 includes the heating wire 42a and a second fan 42f The heating wire 42a generates high heat by being supplied with electric power from the low-voltage battery 33 to heat the ambient air. The second fan 42f is rotatably driven by the power of the fan motor 42b (FIG. 1) to blow the ambient air heated by the heating wire 42a toward the inside of the protection mechanism 6. As a result, the inside of the protection mechanism 6 is also heated by the electric heater 42.

The controller 7 supplies or stops the supply of the electric power of the low-voltage battery 33 to the fan motor 42b via a motor drive circuit (not illustrated) for the fan motor 42b. Accordingly, the controller 7 controls the driving of the fan motor 42b to rotatably drive or stop the second fan 42f. Further, for example, the controller 7 turns on or off a switch (not illustrated) disposed in a power supply line (not illustrated) for supplying the electric power of the low-voltage battery 33 to the heating wire 42a to supply or block electric power to the heating wire 42a, thereby causing the heating wire 42a to generate heat or stop heat generation. That is, as described above, the controller 7 controls execution and stop of the operation of heating the inside of the protection mechanism 6 using the electric heater 42.

The configuration of the electric heater 42 is not limited to the configuration described above, and may be any configuration capable of heating the inside of the protection mechanism 6 by being driven by electric power. In FIG. 5, the electric heater 42 is disposed outside the protection mechanism 6 so as to be in close proximity to the protection mechanism 6. Alternatively, the electric heater 42 may be disposed inside the protection mechanism 6 or may be disposed outside the protection mechanism 6 so as to be away from the protection mechanism 6.

The room temperature detector 48 detects the room temperature inside the protection mechanism 6 and outputs the result to the controller 7. The controller 7 controls execution and stop of the heating operation of the thermal fluid heater 43 and the electric heater 42 in accordance with the detection result of the fluid temperature detector 47, the power level detector 34, or the room temperature detector 48.

Next, a heating operation by the heating system H1 of the working machine 1 will be described.

Figure 6A:
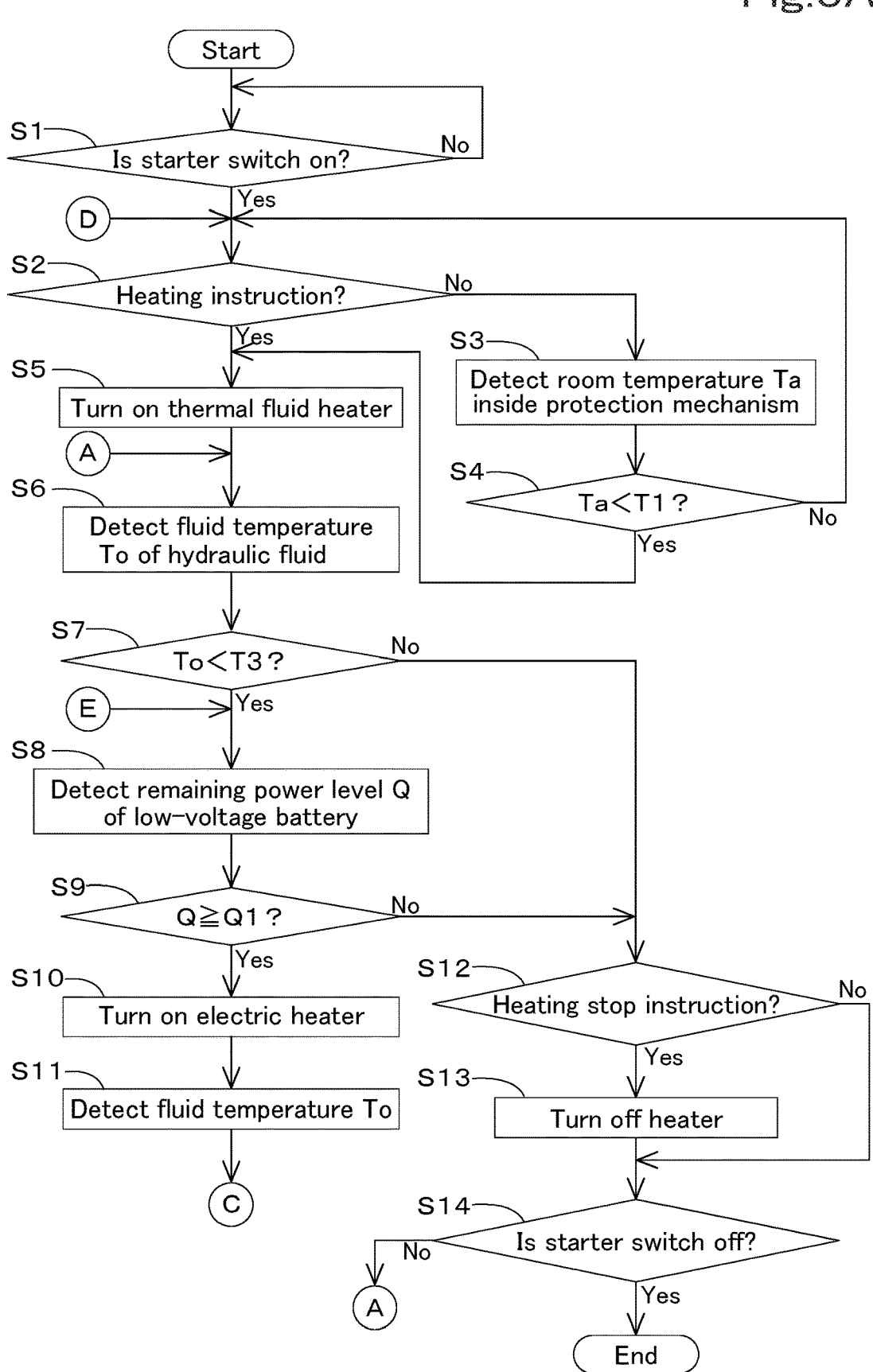
FIG. 6A is a flowchart illustrating an example of a heating operation of the working machine according to the second embodiment.
Figure 6B:
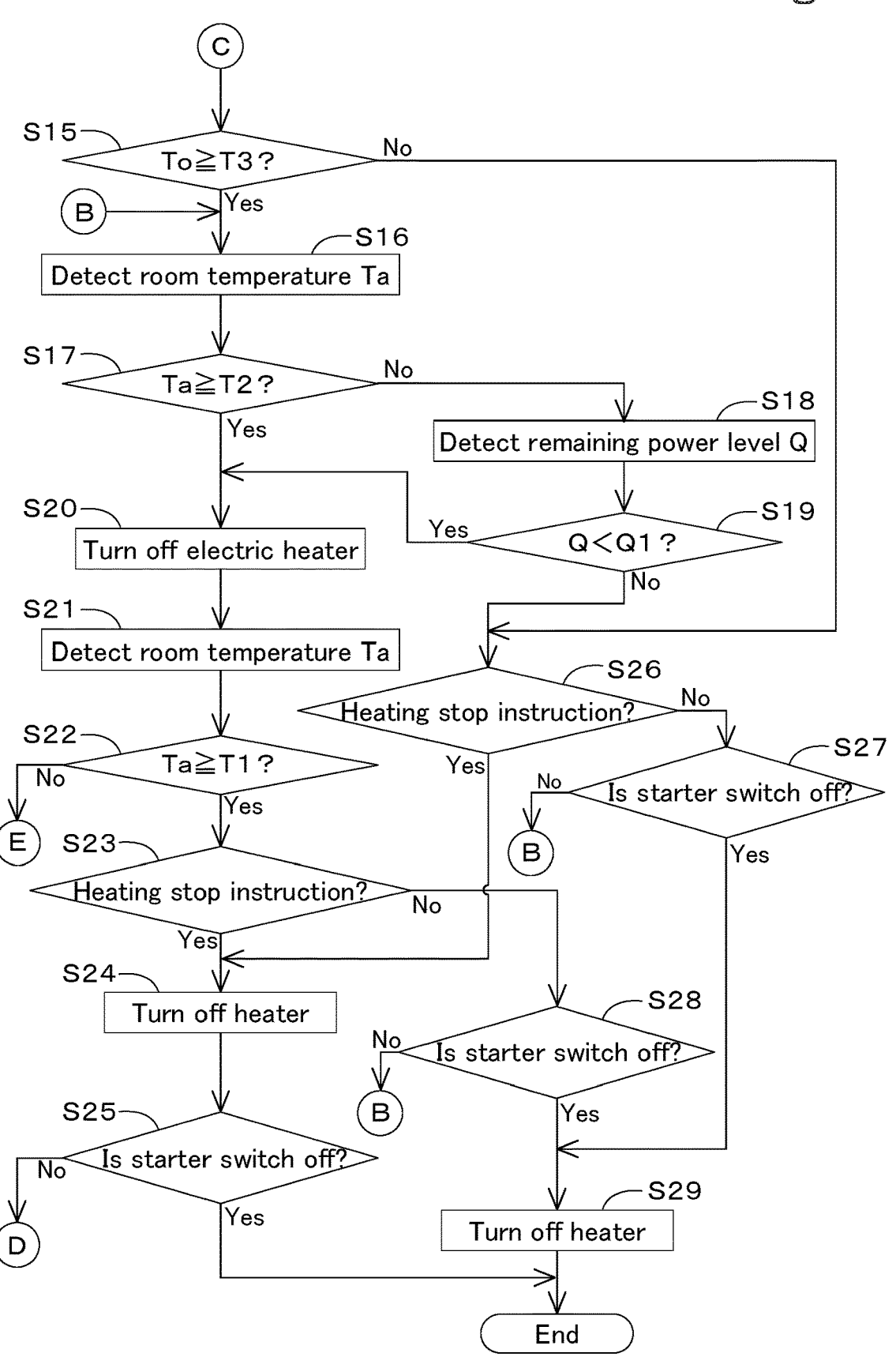
FIG. 6B is a flowchart illustrating the example of the heating operation of the working machine according to the second embodiment.

FIGS. 6A and 6B are a flowchart illustrating an example of the heating operation of the working machine 1 according to the second embodiment. The processes illustrated in FIGS. 6A and 6B are executed by the CPU 7a in accordance with a software program stored in advance in the memory 7b of the controller 7.

For example, after detecting turning on of the starter switch 8 (FIG. 1) by the operator (S1: YES in FIG. 6A), the controller 7 detects a heating instruction for heating the inside (the operator's cab 4R) of the protection mechanism 6, in response to a predetermined operation performed on the operation switch 5b (FIG. 1) (S2: YES). In this case, the controller 7 turns on (drives) the thermal fluid heater 43 (S5). That is, the controller 7 switches the switching valve 44 (FIG. 5) to the first position, causes the hydraulic fluid to flow into the thermal fluid heater 43 through the third fluid passage 53, and causes the thermal fluid heater 43 to heat the inside of the protection mechanism 6.

If no heating instruction is detected (S2: NO), the controller 7 causes the room temperature detector 48 to detect a room temperature Ta inside the protection mechanism 6 (S3). If the room temperature Ta is less than a predetermined threshold T1 (S4: YES), the controller 7 turns on the thermal fluid heater 43 (S5). That is, also in this case, the inside of the protection mechanism 6 is heated by the thermal fluid heater 43. The threshold T1 is set in advance to, for example, a temperature at which an operator in the operator's cab 4R typically feels cold or a temperature set as desired by the operator, and is stored in the memory 7b.

On the other hand, if the room temperature Ta inside the protection mechanism 6 is greater than or equal to the threshold T1 (S4: NO), the controller 7 checks again whether a heating instruction is given (S2), or checks the room temperature Ta (S3, S4). When the thermal fluid heater 43 is turned on (S5), the controller 7 causes the fluid temperature detector 47 (FIG. 5) to detect a fluid temperature To of the hydraulic fluid (S6). At this time, if the fluid temperature To is greater than or equal to a predetermined threshold T3 (S7: NO), the temperature of the hydraulic fluid flowing into the thermal fluid heater 43 is high. Thus, it is sufficiently possible to heat the inside of the protection mechanism 6 only by the thermal fluid heater 43 without driving the electric heater 42. In this case, the controller 7 checks whether a heating stop instruction is given to stop heating inside the protection mechanism 6 (S12).

The threshold T3 is set in advance to be substantially the same as the temperature of the hydraulic fluid after circulating through the hydraulic circuit K a predetermined number of times or more when the working device 20 (FIG. 8) or the traveling device 10 is in operation, for example, and is stored in the memory 7b. The threshold T3 is set to a temperature higher than the room temperature Ta inside the protection mechanism 6, the threshold T1 to be compared with the room temperature Ta, or a threshold T2 described below.

For example, the controller 7 detects no heating stop instruction (512: NO) since a predetermined operation is not performed with the operation switch 5b, and further detects no turning-off of the starter switch 8 (S14: NO). In this case, the controller 7 causes the fluid temperature detector 47 to detect the fluid temperature To again (S6), and executes the subsequent processing. Further, the thermal fluid heater 43 continuously heats the inside of the protection mechanism 6.

If the fluid temperature To detected by the fluid temperature detector 47 is less than the threshold T3 (S7: YES), the temperature of the hydraulic fluid flowing into the thermal fluid heater 43 is low. Thus, the thermal fluid heater 43 alone is insufficient to heat the inside of the protection mechanism 6. In this case, the controller 7 causes the power level detector 34 to detect a remaining power level Q of the low-voltage battery 33 (S8).

If the remaining power level Q of the low-voltage battery 33 is greater than or equal to a predetermined threshold Q1 (S9: YES), the controller 7 turns on (drives) the electric heater 42 (S10). That is, the controller 7 drives the heating wire 42a, the fan motor 42b, and the second fan 42f of the electric heater 42 and causes the electric heater 42 to heat the inside of the protection mechanism 6. The threshold Q1 is set in advance to a value slightly higher than the minimum electric capacity of the low-voltage battery 33 required to drive the various electrical components included in the working machine 1 for a predetermined amount of time, for example, and is stored in the memory 7b.

On the other hand, if the remaining power level Q of the low-voltage battery 33 is less than the threshold Q1 (S9: NO), the electric heater 42 is not turned on. In this case, the controller 7 checks whether a heating stop instruction is given (S12). At this time, if no heating stop instruction is detected (S12: NO) and no turning-off of the starter switch 8 is further detected (S14: NO), the controller 7 causes the fluid temperature detector 47 to detect the fluid temperature To again (S6), and executes the subsequent processing.

When the electric heater 42 is turned on (S10), the controller 7 causes the fluid temperature detector 47 to detect the fluid temperature To (S11). At this time, if the fluid temperature To still remains less than the threshold T3 (S15: NO in FIG. 6B), the controller 7 checks whether a heating stop instruction is given (S26).

On the other hand, if the fluid temperature To is greater than or equal to the threshold T3 (S15: YES), the controller 7 causes the room temperature detector 48 to detect the room temperature Ta inside the protection mechanism 6 (S16). At this time, if the room temperature Ta is less than a predetermined threshold T2 (S17: NO), the controller 7 causes the power level detector 34 to detect the remaining power level Q of the low-voltage battery 33 (S18). The threshold T2 is set in advance to, for example, a temperature at which an operator in the operator's cab 4R does not typically feel cold and that is higher than the threshold T1, and is stored in the memory 7b.

If the remaining power level Q of the low-voltage battery 33 is greater than or equal to the threshold Q1 (S19: NO), the controller 7 checks whether a heating stop instruction is given (S26). At this time, if no heating stop instruction is detected (S26: NO) and no turning-off of the starter switch 8 is further detected (S27: NO), the controller 7 causes the room temperature detector 48 to detect the room temperature Ta again (S16), and executes the subsequent processing.

On the other hand, if the remaining power level Q of the low-voltage battery 33 is less than the threshold Q1 (S19: YES), the controller 7 turns off (stops driving) the electric heater 42 (S20). That is, the controller 7 stops driving the heating wire 42a, the fan motor 42b, and the second fan 42f of the electric heater 42 and causes the electric heater 42 to stop heating the inside of the protection mechanism 6. Also if the room temperature Ta is greater than or equal to the threshold T2 (S17: YES), the controller 7 turns off the electric heater 42 (S20).

If the electric heater 42 is turned off (S20), the controller 7 causes the room temperature detector 48 to detect the room temperature Ta (S21). At this time, if the room temperature Ta is greater than or equal to the threshold T1 (S22: YES), the controller 7 checks whether a heating stop instruction is given (S23).

On the other hand, if the room temperature Ta becomes less than the threshold T1 (S22: NO), the controller 7 causes the power level detector 34 to detect the remaining power level Q of the low-voltage battery 33 again (S8 in FIG. 6A). If the remaining power level Q of the low-voltage battery 33 is greater than or equal to the predetermined threshold Q1 (S9: YES), the controller 7 turns on the electric heater 42 again (S10), and executes the subsequent processing.

In response to a predetermined operation performed using the operation switch 5b during heating of the inside of the protection mechanism 6 by the thermal fluid heater 43 or the electric heater 42, the controller 7 detects a heating stop instruction (S12: YES in FIG. 6A, S23: YES or S26: YES in FIG. 6B). Then, the controller 7 turns off the thermal fluid heater 43 and the electric heater 42 (S13 in FIG. 6A, S24 in FIG. 6B).

In the processing S13 in FIG. 6A and the processing S24 in FIG. 6B, the inside of the protection mechanism 6 is being heated by the thermal fluid heater 43. Thus, the controller 7 switches the switching valve 44 to the second position to block the flow of the hydraulic fluid to the thermal fluid heater 43 and stop the heating operation of the thermal fluid heater 43. In the processing S24 in FIG. 6B, if the inside of the protection mechanism 6 is being heated by the electric heater 42, the controller 7 stops driving the heating wire 42a, the fan motor 42b, and the second fan 42f to stop the heating operation of the electric heater 42.

After the processing S24 in FIG. 6B, if the starter switch 8 is not turned off (S25: NO), the controller 7 again checks whether a heating instruction is given (S2 in FIG. 6A) or checks the temperature Ta inside the protection mechanism 6 (S3, S4).

After the processing S13 in FIG. 6A or the processing S24 in FIG. 6B, if the starter switch 8 is turned off (S14: YES in FIG. 6A or S25: YES in FIG. 6B), the heating operation is terminated.

In the processing S23 or the processing S26 in FIG. 6B, even if no heating stop instruction is given (S23: NO or S26: NO), in response to the starter switch 8 being turned off (S28: YES or S27: YES), the controller 7 turns off the heaters 43 and 42 (S29). As a result, the heating operation is terminated.

In the processing S29, as in the processing S13 in FIG. 6A and the processing S24 in FIG. 6B described above, the controller 7 stops the thermal fluid heater 43 or the electric heater 42 and also stops the heating operation performed by the thermal fluid heater 43 or the electric heater 42.

The plurality of processes illustrated in FIGS. 6A and 6B may be performed in accordance with one or more software programs. For example, the on/off control of the electric heater 42 and the on/off control of the thermal fluid heater 43 may be executed in accordance with different software programs. For example, the on/off control of the electric heater 42 or the thermal fluid heater 43 based on the fluid temperature To and the on/off control of the electric heater 42 or the thermal fluid heater 43 based on the room temperature Ta may be executed in accordance with different software programs. The processes illustrated in FIGS. 6A and 6B may be executed by hardware such as an electric circuit or a sequence circuit, for example.

In FIG. 6A, if a heating instruction is given (S2: YES) or if the room temperature Ta inside the protection mechanism 6 is less than the threshold T1 (S4: YES), the thermal fluid heater 43 is turned on (S5). Alternatively, in any of the above cases, the thermal fluid heater 43 may be turned on after it is confirmed that the temperature To of the hydraulic fluid is greater than or equal to the threshold T3. In this case, as long as the temperature To of the hydraulic fluid is less than the threshold T3, the inside of the protection mechanism 6 is not heated by the thermal fluid heater 43. The electric heater 42 is turned on, whereby the inside of the protection mechanism 6 can be heated by the electric heater 42.

In the embodiment described above, the controller 7 performs on/off control of the electric heater 42 in accordance with the fluid temperature To. However, this does not imply any limitation, and the output (heating intensity) of the electric heater 42 may be changed stepwise or continuously in accordance with the fluid temperature To. Specifically, for example, the output of the electric heater 42 may be controlled stepwise or continuously such that the output of the electric heater 42 decreases (heating intensity decreases) as the fluid temperature To increases, and the electric heater 42 may stop heating when the fluid temperature To becomes greater than or equal to a predetermined temperature.

In the heating system H1 illustrated in FIG. 5, the thermal fluid heater 43 is disposed in the third fluid passage 53 that branches off and merges with the second fluid passage 52. Alternatively, as illustrated in FIG. 7, for example, the thermal fluid heater 43 may be disposed in a third fluid passage 59 that branches off and merges with the first fluid passage 51.

Figure 7:
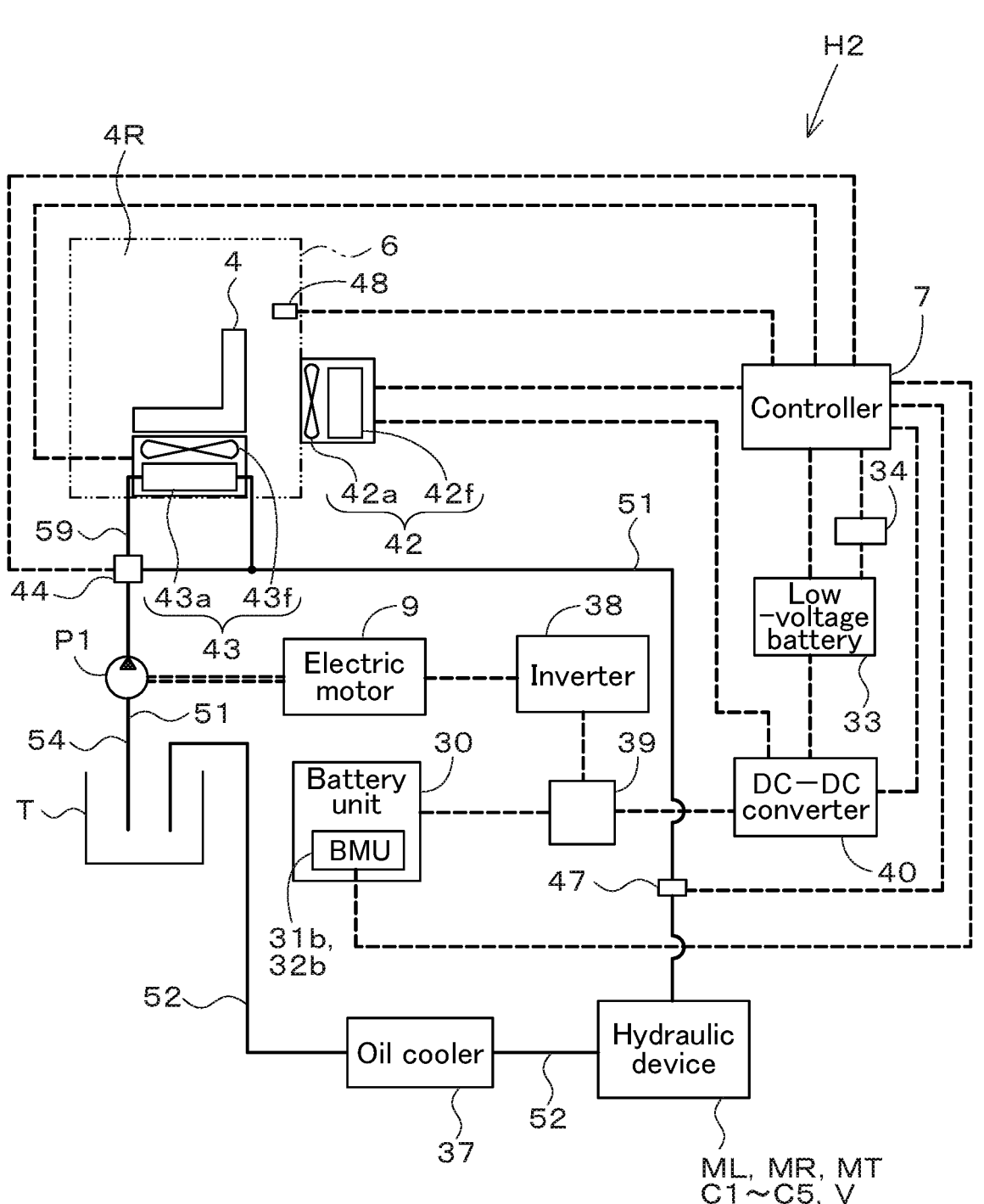
FIG. 7 is a configuration diagram of another example of the heating system of the working machine according to the second embodiment.

FIG. 7 is a configuration diagram of another example of a heating system H2 of the working machine 1 according to the second embodiment.

The heating system H2 is a system for heating the inside of the protection mechanism 6. In the heating system H2, the thermal fluid heater 43 is disposed in the third fluid passage 59 through which hydraulic fluid flows. The third fluid passage 59 is included in the fluid passage 50 of the working machine 1 illustrated in FIG. 2. As illustrated in FIG. 7, the third fluid passage 59 branches off from the first fluid passage 51 through which the hydraulic fluid delivered from the hydraulic pump P1 flows toward the control valve unit V included in the hydraulic devices, extends through the inside of the protection mechanism 6, and merges with the first fluid passage 51.

The switching valve 44 is disposed at a branch point of the third fluid passage 53 from the first fluid passage 51. The hydraulic fluid delivered from the hydraulic pump P1 passes through the first fluid passage 51 and flows to at least one of the control valves V1 to V8 of the control valve unit V via the switching valve 44.

At this time, for example, the controller 7 energizes the solenoid of the solenoid valve included in the switching valve 44 to switch the switching valve 44 to the first position, and causes the hydraulic fluid to flow to the third fluid passage 59. At the same time, the controller 7 causes the fan motor 43b (FIG. 1) to rotatably drive the first fan 43f. As a result, the hydraulic fluid heated by the hydraulic pump P1 or the like flows through the third fluid passage 59 and passes through the heat exchanger 43a of the thermal fluid heater 43, and heat exchange is performed between the hydraulic fluid and the ambient air. The heated air is blown to the inside (the operator's cab 4R) of the protection mechanism 6 to heat the inside of the protection mechanism 6. The hydraulic fluid circulated through the fluid passages 54, 51, and 52 once or more times is heated not only by the hydraulic pump P1 but also by the control valves V1 to V8 of the control valve unit V and the hydraulic actuators ML, MR, MT, and C1 to C5.

By contrast, for example, the controller 7 deenergizes the solenoid of the solenoid valve included in the switching valve 44 to switch the switching valve 44 to the second position, and blocks the hydraulic fluid to the third fluid passage 59. At the same time, the controller 7 causes the fan motor 43b included in the thermal fluid heater 43 to stop the first fan 43f. As a result, the hydraulic fluid flows to at least one of the control valves V1 to V8 of the control valve unit V among the hydraulic devices ML, MR, MT, C1 to C5, and V through the first fluid passage 51 without flowing through the third fluid passage 59. Then, the thermal fluid heater 43 stops heating the inside of the protection mechanism 6. That is, as described above, the controller 7 controls execution and stop of the operation of heating the inside of the protection mechanism 6 using the thermal fluid heater 43.

The fluid temperature detector 47 is disposed between a junction of the first fluid passage 51 and the third fluid passage 53 and the hydraulic devices ML, MR, MT, C1 to C5, and V. The fluid temperature detector 47 detects the fluid temperature of the hydraulic fluid flowing through the first fluid passage 51 and outputs the detection result to the controller 7.

In the heating system H2, the controller 7 controls the junction box 39 and the DC-DC converter 40 to drive the electric heater 42 with the electric power of the battery unit 30. That is, the heating wire 42a and the fan motor 42b (FIG. 1) of the electric heater 42 are driven by the electric power supplied from the battery unit 30 through the junction box 39 and the DC-DC converter 40. Like the electric heater 42, the fan motor 43b of the thermal fluid heater 43, the switching valve 44, the fluid temperature detector 47, or the room temperature detector 48 may be driven by the electric power of the battery unit 30 or may be driven by the electric power of the low-voltage battery 33.

The controller 7 turns on or off a switch (not illustrated) disposed in a power supply line (not illustrated) for supplying the electric power of the battery unit 30 to the heating wire 42a through the junction box 39 and the DC-DC converter 40 to supply or block electric power to the heating wire 42a, thereby causing the heating wire 42a to generate heat or stop heat generation. That is, as described above, the controller 7 controls execution and stop of the operation of heating the inside of the protection mechanism 6 using the electric heater 42.

Further, the controller 7 controls execution and stop of the heating operation of the thermal fluid heater 43 and the electric heater 42 in accordance with the fluid temperature of the hydraulic fluid detected by the fluid temperature detector 47, the room temperature inside the protection mechanism 6 detected by the room temperature detector 48, or the remaining capacities of the battery packs 31 and 32 (FIG. 1) of the battery unit 30 detected by the BMUs 31b and 32b.

The heating system H2 described above can also execute processing similar to that illustrated in FIG. 6A and FIG. 6B. In this case, instead of the processing S8 in FIG. 6A and the processing S18 in FIG. 6B, a process of detecting the remaining capacities of the battery packs 31 and 32 during power supply is executed by the BMUs 31b and 32b of the battery unit 30. Further, instead of the processing S9 in FIG. 6A and the processing S19 in FIG. 6B, a process of comparing the remaining capacities of the battery packs 31 and 32 during power supply with a predetermined threshold is executed.

Working machines 1 according to the second present embodiment achieve the following effects.

A working machine 1 according to a second embodiment includes: a machine body 2; a protection mechanism 6 to protect an operator's seat 4 on the machine body 2; a storage battery 30, 33 provided in or on the machine body 2; an electric motor 9 to be driven by electric power from the storage battery 30; a hydraulic pump P1, P2 to be driven by power from the electric motor 9; a working device 10, 20 to be driven by a hydraulic pressure of hydraulic fluid supplied from the hydraulic pump P1, P2; a thermal fluid heater 43 to heat an inside of the protection mechanism 6 by heat from the hydraulic fluid; and an electric heater 42 to be driven by electric power from the storage battery 33, 30 to heat the inside of the protection mechanism 6. In this configuration, the working machine 1 includes the thermal fluid heater 43 to heat the inside of the protection mechanism 6 by the heat of the hydraulic fluid, and the electric heater 42 to be driven by the electric power from the storage battery(batteries) 30 and/or 33 to heat the inside of the protection mechanism 6. This makes it possible to efficiently heat the inside of the protection mechanism 6 by, for example, controlling the operation of the electric heater 42 according to the temperature of the hydraulic fluid, and also to reduce the power consumption of the storage battery(batteries) 30 and/or 33. Furthermore, the power consumption of the storage battery (batteries) 30 and/or 33 can be reduced, making it possible to ensure long-time operation of the components of the working machine 1, such as the working device 20.

The working machine 1 may further include a controller 7 to control operation of the thermal fluid heater 43 and operation of the electric heater 42. This configuration makes it possible to sufficiently heat the inside of the protection mechanism 6 by selectively using the electric heater 42 which provides quicker heating than the thermal fluid heater 43, and the thermal fluid heater 43 which consumes less power than the electric heater 42, as necessary, and to reduce the power consumption of the storage battery(batteries) 30 and/or 33.

The working machine 1 may further include a fluid temperature detector 47 to detect a temperature To of the hydraulic fluid. The controller 7 may be configured or programmed to control the operation of the thermal fluid heater 43 and the operation of the electric heater 42 based on a result detected by the fluid temperature detector 47. This configuration makes it possible to drive the thermal fluid heater 43 and the electric heater 42 according to the temperature To of the hydraulic fluid to heat the inside of the protection mechanism 6 and to reduce the power consumption of the storage batteries 30 and 33.

The controller 7 may be configured or programmed to cause the electric heater 42 to perform heating and cause the thermal fluid heater 43 to not perform heating or perform heating when the temperature To of the hydraulic fluid is lower than a predetermined threshold T3, and cause the electric heater 42 to not perform heating and cause the thermal fluid heater 43 to perform heating when the temperature To of the hydraulic fluid is higher than or equal to the threshold T3. With this configuration, when the temperature To of the hydraulic fluid is low, the inside of the protection mechanism 6 is heated at least by the electric heater 42 to sufficiently heat the inside of the protection mechanism 6. When the temperature To of the hydraulic fluid is high, the inside of the protection mechanism 6 is heated by the thermal fluid heater 43, and the electric heater 42 is stopped, making it possible to sufficiently heat the inside of the protection mechanism 6 and to reduce the power consumption of the storage battery(batteries) 30 and/or 33.

The working machine 1 may further include a power level detector 34, 31b, 32b to detect a remaining power level Q of the storage battery 33, 30. The controller 7 may be configured or programmed to control the operation of the electric heater 42 based on a result detected by the power level detector 34, 31b, 32b. With this configuration, for example, when the remaining power level Q of the storage battery (batteries) 30 and/or 33 is low, the electric heater 42 does not perform heating, making it possible to extend the operable time of the working machine 1. Furthermore, when the remaining power level Q of the storage battery(batteries) 30 and/or 33 is high, the electric heater 42 performs heating, making it possible to sufficiently heat the inside of the protection mechanism 6.

The working machine 1 may further include a power level detector 34, 31b, 32b to detect a remaining power level Q of the storage battery 33, 30. The controller 7 may be configured or programmed to cause the electric heater 42 to perform heating and cause the thermal fluid heater 43 to not perform heating or perform heating when the temperature To of the hydraulic fluid is lower than a predetermined threshold T3 and the remaining power level Q of the storage battery 33, 30 is higher than or equal to a predetermined threshold Q1, cause the electric heater 42 to not perform heating and cause the thermal fluid heater 43 to not perform heating or perform heating when the temperature To of the hydraulic fluid is lower than the threshold T3 and the remaining power level Q of the storage battery 33, 30 is lower than the threshold Q1, and cause the electric heater 42 to not perform heating and cause the thermal fluid heater 43 to perform heating when the temperature To of the hydraulic fluid is higher than or equal to the threshold T3. With this configuration, when the temperature To of the hydraulic fluid is low and the remaining power level Q of the storage battery(batteries) 30 and/or 33 is high, the inside of the protection mechanism 6 can be heated by the electric heater 42. Furthermore, even if the temperature To of the hydraulic fluid is low, when the remaining power level Q of the storage battery(batteries) 30 and/or 33 is low, the electric heater 42 is stopped, thus suppressing consumption of the electric power of the storage battery(batteries) 30 and/or 33.

The working machine 1 may further include: a hydraulic fluid tank T to store the hydraulic fluid; a control valve V1 to V7 to control a flow rate of the hydraulic fluid from the hydraulic pump P1 to a hydraulic actuator C1 to C5, ML, MR of the working device 10, 20; a first fluid passage 51 to allow the hydraulic fluid sucked from the hydraulic fluid tank T and then delivered by the hydraulic pump P1, P2 to flow toward the control valve V1 to V7; a second fluid passage 52 to allow the hydraulic fluid having passed through the control valve V1 to V7 to flow toward the hydraulic fluid tank T; and a third fluid passage 53, 59 branching from one of the first fluid passage 51 and the second fluid passage 52, extending through the inside of the protection mechanism 6, and merging with the one of the first fluid passage 51 and the second fluid passage 52. The thermal fluid heater 43 may include a heat exchanger 43a to perform heat exchange between the hydraulic fluid flowing in the third fluid passage 53, 59 and ambient air, and a first fan 43f to blow air around the heat exchanger 43a toward the inside of the protection mechanism 6. This configuration allows the thermal fluid heater 43 to efficiently heat the inside of the protection mechanism 6 by the heat of the hydraulic fluid heated by passing through the hydraulic pump P1 or through the hydraulic pump P1 and the hydraulic device(s) such as the control valve(s) V1 to V7 of the control valve unit V and the hydraulic actuator(s) C1 to C5, ML, and/or MR.

The working machine 1 may further include: a switching valve 44 switchable between a first position in which the hydraulic fluid is allowed to flow to the third fluid passage 53, 59 and a second position in which the hydraulic fluid to the third fluid passage 53, 59 is blocked; and a controller 7 to switch the switching valve 44 to the first position or the second position to switch between causing the thermal fluid heater 43 to perform heating and causing the thermal fluid heater 43 to not perform heating. This configuration makes it easy to automatically switch between performing and not performing heating the inside of the protection mechanism 6 by the thermal fluid heater 43.

The working machine 1 may further include a fluid cooler 37 disposed in the second fluid passage 52 to cool the hydraulic fluid flowing in the second fluid passage 52. The third fluid passage 59 may be connected to the second fluid passage 52 at a location closer to the control valve(s) V1 to V8 than the fluid cooler 37 is. This configuration allows the thermal fluid heater 43 disposed in the third fluid passage 59 to efficiently heat the inside of the protection mechanism 6 by the high heat of the hydraulic fluid that is heated by the hydraulic device(s) such as the hydraulic pump P1, the control valve(s) V1 to V8 of the control valve unit V, and/or the hydraulic actuator(s) C1 to C5, ML, MR, and/or MT before being cooled by the fluid cooler 37.

The electric heater 42 may include a heating wire 42a to generate heat by being supplied with electric power, and a second fan 42f to blow air around the heating wire 42a toward the inside of the protection mechanism 6. With this configuration, the ambient air heated by the heating wire 42a is sent to the inside of the protection mechanism 6 by the second fan 42f, making it possible to more efficiently heat the inside of the protection mechanism 6.

The embodiments described above have described an example in which the present invention is applied to the working machine 1 such as a backhoe. However, the target to which the present invention is to be applied is not limited to this. For example, the present invention may be applied to any other construction machine such as a wheel loader, a compact track loader, or a skid-steer loader, or may be applied to an agricultural machine such as a tractor, a combine, a rice transplanter, or a lawn mower. The present invention is applied not only to an electric working machine but also to a working machine equipped with a drive source other than an electric motor, such as an engine.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
   a machine body;
   a protection mechanism to protect an operator's seat on the machine body;
   a heater to heat an inside of the protection mechanism;
   a radiator device to cool an object to be cooled, the radiator device including a heat exchanger to perform heat exchange between the object and ambient air; and
   a first flow passage to guide air heated by the heat exchanger to the heater and to guide the air further heated by the heater to the inside of the protection mechanism.

2. The working machine according to claim 1, wherein the heater is operable to be driven by electric power from a storage battery provided in or on the machine body to heat air flowing in the first flow passage.

3. The working machine according to claim 1, further comprising an air blower to blow the air heated by the heat exchanger to the inside of the protection mechanism through the first flow passage.

4. The working machine according to claim 3, wherein the air blower includes a multiple-purpose fan to blow cooling air to the radiator device and to blow the ambient air heated by the radiator device to the first flow passage.

5. The working machine according to claim 1, further comprising a second flow passage to guide air inside the protection mechanism to the radiator device.

6. The working machine according to claim 5, further comprising an inside/outside air switching mechanism switchable between an inside-air circulation state in which the air inside the protection mechanism is guided to the radiator device through the second flow passage and an outside-air introduction state in which a flow of the air from the second flow passage to the radiator device is blocked and outside air is guided to the radiator device.

7. The working machine according to claim 1, further comprising:
   a cooler to cool the inside of the protection mechanism; and
   a cooling/heating switching mechanism switchable between a heating state in which a flow of air from the cooler to the inside of the protection mechanism is blocked and air heated by the heater is guided to the inside of the protection mechanism and a cooling state in which a flow of air from the heater to the inside of the protection mechanism is blocked and cool air blown from the cooler is guided to the inside of the protection mechanism.

8. The working machine according to claim 1, further comprising:
a third flow passage to release air from the radiator device or the first flow passage to outside of the working machine; and
a releasing/non-releasing switching mechanism switchable between a releasing state in which a flow of air from the radiator device to the first flow passage or from the first flow passage to the inside of the protection mechanism is blocked and air is guided from the radiator device or the first flow passage to the third flow passage and a non-releasing state in which a flow of air from the radiator device or the first flow passage to the third flow passage is blocked and air is guided from the radiator device to the first flow passage or from the first flow passage to the inside of the protection mechanism.

9. A working machine comprising:
a machine body;
a protection mechanism to protect an operator's seat on the machine body;
a storage battery provided in or on the machine body;
an electric motor to be driven by electric power from the storage battery;
a hydraulic pump to be driven by power from the electric motor;
a working device to be driven by a hydraulic pressure of hydraulic fluid supplied from the hydraulic pump;
a thermal fluid heater to heat an inside of the protection mechanism by heat from the hydraulic fluid;
an electric heater to be driven by electric power from the storage battery to heat the inside of the protection mechanism;
a fluid temperature detector to detect a temperature of the hydraulic fluid; and
a controller to control operation of the thermal fluid heater and operation of the electric heater based on a result detected by the fluid temperature detector, wherein
the controller is configured or programmed to:
cause the electric heater to perform heating and cause the thermal fluid heater to not perform heating or perform heating when the temperature of the hydraulic fluid is lower than a first threshold; and
cause the electric heater to not perform heating and cause the thermal fluid heater to perform heating when the temperature of the hydraulic fluid is higher than or equal to the first threshold.

10. The working machine according to claim 9, further comprising a power level detector to detect a remaining power level of the storage battery, wherein
the controller is configured or programmed to control the operation of the electric heater based on a result detected by the power level detector.

11. The working machine according to claim 9, further comprising:
a power level detector to detect a remaining power level of the storage battery, wherein
the controller is configured or programmed to:
cause the electric heater to perform heating and cause the thermal fluid heater to not perform heating or perform heating when the temperature of the hydraulic fluid is lower than the first threshold and the remaining power level of the storage battery is higher than or equal to a second threshold; and cause the electric heater to not perform heating and cause the thermal fluid heater to not perform heating or perform heating when the temperature of the hydraulic fluid is lower than the first threshold and the remaining power level of the storage battery is lower than the second threshold.

12. The working machine according to claim 9, further comprising:
a hydraulic fluid tank to store the hydraulic fluid;
a control valve to control a flow rate of the hydraulic fluid to a hydraulic actuator of the working device;
a first fluid passage to allow the hydraulic fluid sucked from the hydraulic fluid tank and then delivered by the hydraulic pump to flow toward the control valve;
a second fluid passage to allow the hydraulic fluid having been discharged from the hydraulic actuator and passed through the control valve to flow toward the hydraulic fluid tank; and
a third fluid passage branching from one of the first fluid passage and the second fluid passage, extending through the inside of the protection mechanism, and merging with the one of the first fluid passage and the second fluid passage, wherein
the thermal fluid heater includes
a heat exchanger to perform heat exchange between the hydraulic fluid flowing in the third fluid passage and ambient air, and
a first fan to blow air around the heat exchanger toward the inside of the protection mechanism.

13. The working machine according to claim 12, further comprising a switching valve switchable between a first position in which the hydraulic fluid is allowed to flow to the third fluid passage and a second position in which the hydraulic fluid to the third fluid passage is blocked, wherein
the controller is configured or programmed to switch the switching valve to the first position or the second position to switch between causing the thermal fluid heater to perform heating and causing the thermal fluid heater to not perform heating.

14. A working machine comprising:
a machine body;
a protection mechanism to protect an operator's seat on the machine body;
a storage battery provided in or on the machine body;
an electric motor to be driven by electric power from the storage battery;
a hydraulic pump to be driven by power from the electric motor;
a working device to be driven by a hydraulic pressure of hydraulic fluid supplied from the hydraulic pump;
a thermal fluid heater to heat an inside of the protection mechanism by heat from the hydraulic fluid;
an electric heater to be driven by electric power from the storage battery to heat the inside of the protection mechanism;
a hydraulic fluid tank to store the hydraulic fluid;
a control valve to control a flow rate of the hydraulic fluid from the hydraulic pump to a hydraulic actuator of the working device;
a first fluid passage to allow the hydraulic fluid sucked from the hydraulic fluid tank and then delivered by the hydraulic pump to flow toward the control valve;
a second fluid passage to allow the hydraulic fluid having been discharged from the hydraulic actuator and passed through the control valve to flow toward the hydraulic fluid tank; and a third fluid passage branching from one of the first fluid passage and the second fluid passage, extending through the inside of the protection mechanism, and merging with the one of the first fluid passage and the second fluid passage, wherein the thermal fluid heater includes a heat exchanger to perform heat exchange between the hydraulic fluid flowing in the third fluid passage and ambient air, and a first fan to blow air around the heat exchanger toward the inside of the protection mechanism.

15. The working machine according to claim 14, further comprising:

a switching valve switchable between a first position in which the hydraulic fluid is allowed to flow to the third fluid passage and a second position in which the hydraulic fluid to the third fluid passage is blocked; and a controller to switch the switching valve to the first position or the second position to switch between causing the thermal fluid heater to perform heating and causing the thermal fluid heater to not perform heating.

16. The working machine according to claim 14, further comprising:

a fluid temperature detector to detect a temperature of the hydraulic fluid; and a controller to control operation of the thermal fluid heater and operation of the electric heater based on a result detected by the fluid temperature detector.

17. The working machine according to claim 14, further comprising a power level detector to detect a remaining power level of the storage battery, wherein the controller is configured or programmed to control the operation of the electric heater based on a result detected by the power level detector.

18. The working machine according to claim 14, further comprising:

a fluid temperature detector to detect a temperature of the hydraulic fluid;

a power level detector to detect a remaining power level of the storage battery; and a controller to control operation of the thermal fluid heater and operation of the electric heater, wherein the controller is configured or programmed to:

cause the electric heater to perform heating and cause the thermal fluid heater to not perform heating or perform heating when the temperature of the hydraulic fluid is lower than a first threshold and the remaining power level of the storage battery is higher than or equal to a second threshold;

cause the electric heater to not perform heating and cause the thermal fluid heater to not perform heating or perform heating when the temperature of the hydraulic fluid is lower than the first threshold and the remaining power level of the storage battery is lower than the second threshold; and cause the electric heater to not perform heating and cause the thermal fluid heater to perform heating when the temperature of the hydraulic fluid is higher than or equal to the first threshold.

* * * * *